(12) United States Patent
Zhou et al.

(10) Patent No.: US 12,267,742 B2
(45) Date of Patent: Apr. 1, 2025

(54) GROUP BASED CELL CONFIGURATION FOR INTER-CELL MOBILITY

(71) Applicant: QUALCOMM Incorporated, San Diego, CA (US)

(72) Inventors: Shanyu Zhou, San Diego, CA (US); Jelena Damnjanovic, Del Mar, CA (US); Tao Luo, San Diego, CA (US); Peter Gaal, San Diego, CA (US); Junyi Li, Fairless Hills, PA (US); Aleksandar Damnjanovic, Del Mar, CA (US)

(73) Assignee: QUALCOMM Incorporated, San Diego, CA (US)

(*) Notice: Subject to any disclaimer, the term of this patent is extended or adjusted under 35 U.S.C. 154(b) by 269 days.

(21) Appl. No.: 17/846,891

(22) Filed: Jun. 22, 2022

(65) Prior Publication Data

US 2023/0422119 A1 Dec. 28, 2023

(51) Int. Cl.
*H04W 36/08* (2009.01)
*H04W 36/00* (2009.01)

(52) U.S. Cl.
CPC ....... *H04W 36/08* (2013.01); *H04W 36/0058* (2018.08); *H04W 36/0061* (2013.01)

(58) Field of Classification Search
CPC ............ H04W 36/08; H04W 36/0058; H04W 36/0061
See application file for complete search history.

(56) References Cited

U.S. PATENT DOCUMENTS

2022/0014983 A1 1/2022 Zhou et al.

OTHER PUBLICATIONS

International Search Report and Written Opinion—PCT/US2023/067921—ISA/EPO—Sep. 15, 2023 (2204785WO).
Mediatek Inc: "Revised WID on Further NR Mobility Enhancements", 3GPP TSG RAN Meeting #96, RP-221799, 3rd Generation Partnership Project, Mobile Competence Centre, 650, Route Des Lucioles, F-06921 Sophia-Antipolis Cedex, France, vol. TSG RAN, No. Budapest, Hungary, Jun. 6, 2022-Jun. 9, 2022, Jun. 9, 2022, 5 pages, XP052191016, p. 2.

(Continued)

*Primary Examiner* — Sam Bhattacharya
(74) *Attorney, Agent, or Firm* — Holland & Hart LLP

(57) ABSTRACT

Methods, systems, and devices for wireless communications are described. A user equipment (UE) may receive from a network entity first control signaling identifying, of multiple cell groups configured at the UE, an inter-cell mobility configuration for a set of one or more cell groups for use at the UE. In some examples, each cell group of the multiple cell groups may include a primary cell (PCell) and zero or more secondary cells (SCells). The UE may transmit a measurement report for each cell group of the set of one or more cell groups for inter-cell mobility. The UE may receive, at least in part in response to transmitting the measurement report, second control signaling activating or deactivating a primary cell group for inter-cell mobility from one or more cell groups of the set of one or more cell groups.

30 Claims, 16 Drawing Sheets

(56) References Cited

OTHER PUBLICATIONS

Mobility Enhancements Moderator (CMCC): "Moderator's Summary for Discussion [RAN94e-R18Prep-10] Mobility Enhancements", 3GPP TSG RAN Meeting #94-e, RP-212670, 3rd Generation Partnership Project, Mobile Competence Centre, 650, Route Des Lucioles, F-06921 Sophia-Antipolis Cedex, France, vol. RAN WG3, No. Electronic Meeting, Dec. 6, 2021-Dec. 17, 2021, Nov. 2, 2021, pp. 1-74, XP052073752, pp. 6, 29, p. 46.

Qualcomm Incorporated: "L1/L2 Mobility—General Concepts and Configuration", 3GPP TSG-RAN WG2 Meeting #119-e, R2-2207340, 3rd Generation Partnership Project, Mobile Competence Centre, 650, Route Des Lucioles, F-06921 Sophia-Antipolis Cedex, France, vol. RAN WG2, No. Electronic, Aug. 15, 2022-Aug. 26, 2022, 6 pages, Aug. 8, 2022, XP052260662, p. 4, figure 4.

GROUP BASED CELL CONFIGURATION FOR INTER-CELL MOBILITY

FIELD OF TECHNOLOGY

The following relates to wireless communications, including group based cell configuration for inter-cell mobility.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support group based cell configuration for inter-cell mobility. For example, the described techniques provide for a network to reduce latency associated with updating groups of cells associated with a network entity for use at a user equipment (UE). For example, the UE may receive from the network entity a control signal configuring multiple groups of cells enabled with inter-cell layer 1 (L1) and layer 2 (L2) mobility. Based on configuring the groups of cells, the network entity may use L1 or L2 messaging to indicate cell group updates. For example, the network may transmit signaling (e.g., via L1 or L2) activating one or more groups of cells or deactivating one or more groups of cells. In some examples, the network entity may also update a primary cell (PCell) used for a group of cells. For example, a secondary cell (SCell) in a group of cells may be updated for use as a PCell and an active PCell of the group of cells may be updated for use as an SCells.

In some examples, the network entity may transmit control signaling via L1 or L2 that removes one or more groups of configured cells from the multiple groups of cells configured with L1 and L2 mobility. For example, as part of a control signal, the network entity may configure a mobility release list associated with the multiple groups of cells. In some examples, each group of cells may have an associated set of communication parameters. In some examples, the network entity may configure a first group cells with a first set of parameters and configure a second group of cells with a second set of parameters via a delta configuration with reference to the first set of parameters. For example, the delta configuration may indicate an offset of the second set of parameters relative to the first set of parameters.

A method for wireless communications at a UE is described. The method may include receiving first control signaling identifying, of a set of multiple cell groups configured at the UE, an inter-cell mobility configuration for a set of cell groups for use at the UE, where each cell group of the set of multiple cell groups includes a PCell and zero or more SCells, transmitting a measurement report for each cell group of the set of cell groups for inter-cell mobility, and receiving, at least in part in response to transmitting the measurement report, second control signaling activating or deactivating a PCell group for inter-cell mobility from one or more cell groups of the set of cell groups.

An apparatus for wireless communications at a UE is described. The apparatus may include a processor, memory coupled with the processor, and instructions stored in the memory. The instructions may be executable by the processor to cause the apparatus to receive first control signaling identifying, of a set of multiple cell groups configured at the UE, an inter-cell mobility configuration for a set of cell groups for use at the UE, where each cell group of the set of multiple cell groups includes a PCell and zero or more SCells, transmit a measurement report for each cell group of the set of cell groups for inter-cell mobility, and receive, at least in part in response to transmitting the measurement report, second control signaling activating or deactivating a PCell group for inter-cell mobility from one or more cell groups of the set of cell groups.

Another apparatus for wireless communications at a UE is described. The apparatus may include means for receiving first control signaling identifying, of a set of multiple cell groups configured at the UE, an inter-cell mobility configuration for a set of cell groups for use at the UE, where each cell group of the set of multiple cell groups includes a PCell and zero or more SCells, means for transmitting a measurement report for each cell group of the set of cell groups for inter-cell mobility, and means for receiving, at least in part in response to transmitting the measurement report, second control signaling activating or deactivating a PCell group for inter-cell mobility from one or more cell groups of the set of cell groups.

A non-transitory computer-readable medium storing code for wireless communications at a UE is described. The code may include instructions executable by a processor to receive first control signaling identifying, of a set of multiple cell groups configured at the UE, an inter-cell mobility configuration for a set of cell groups for use at the UE, where each cell group of the set of multiple cell groups includes a PCell and zero or more SCells, transmit a measurement report for each cell group of the set of cell groups for inter-cell mobility, and receive, at least in part in response to transmitting the measurement report, second control signaling activating or deactivating a PCell group for inter-cell mobility from one or more cell groups of the set of cell groups.

In some examples of the method, apparatuses, and non-transitory computer-readable medium described herein, receiving the first control signaling identifying the inter-cell mobility configuration may include operations, features, means, or instructions for receiving, for each cell group of the set of multiple cell groups, a respective set of communication parameters for the cell group.

In some examples of the method, apparatuses, and non-transitory computer-readable medium described herein, receiving the respective sets of communication parameters may include operations, features, means, or instructions for receiving a first set of communication parameters for a first cell group of the set of multiple cell groups and receiving a second set of communication parameters for a second cell group of the set of multiple cell groups, the second set of communication parameters including one or more offsets relative to the first set of communication parameters.

In some examples of the method, apparatuses, and non-transitory computer-readable medium described herein, the respective sets of communication parameters include a bandwidth part indication, a cell index associated with a respective cell group, one or more synchronization signal block (SSB) measurements, timing information, or a combination thereof.

In some examples of the method, apparatuses, and non-transitory computer-readable medium described herein, receiving the first control signaling identifying the inter-cell mobility configuration may include operations, features, means, or instructions for receiving a first indication configuring one or more SCells of the set of multiple cell groups with a PCell capability.

In some examples of the method, apparatuses, and non-transitory computer-readable medium described herein, receiving the second control signaling may include operations, features, means, or instructions for receiving a second indication for at least one activated cell group, the second indication updating the PCell to be a SCell and a SCell of the zero or more SCells to be a PCell, the second indication in accordance with the PCell capability.

In some examples of the method, apparatuses, and non-transitory computer-readable medium described herein, the first control signaling includes, for each cell group of the set of multiple cell groups, an indication of whether the cell group may be enabled or disabled for inter-cell mobility and the second control signaling changes the indication associated with one or more cell groups of the set of multiple cell groups to activate or deactivate the one or more cell groups.

Some examples of the method, apparatuses, and non-transitory computer-readable medium described herein may further include operations, features, means, or instructions for receiving a set of indicators corresponding to the set of multiple cell groups, each indicator of the set of indicators identifying whether to release a respective cell group of the set of multiple cell groups, including the one or more cell groups.

Some examples of the method, apparatuses, and non-transitory computer-readable medium described herein may further include operations, features, means, or instructions for receiving a set of indicators corresponding to the set of cell groups for use at the UE for inter-cell mobility, each indicator of the set of indicators identifying whether to release a respective cell group of at least on cell group for use at the UE for inter-cell mobility.

Some examples of the method, apparatuses, and non-transitory computer-readable medium described herein may further include operations, features, means, or instructions for receiving third control signaling identifying a list of indices corresponding to the set of cell groups for use at the UE for inter-cell mobility, each index of the list of indices corresponding to a respective cell group of the set of cell groups, where the set of indicators may be compared to the list of indices to activate or deactivate the one or more cell groups for inter-cell mobility.

In some examples of the method, apparatuses, and non-transitory computer-readable medium described herein, the first control signaling includes radio resource control (RRC) signaling, and the second control signaling includes a downlink control information (DCI) message or a media access control control element (MAC-CE).

Some examples of the method, apparatuses, and non-transitory computer-readable medium described herein may further include operations, features, means, or instructions for receiving a measurement report configuration indicating one or more measurements to include in the measurement report for the set of cell groups, where the measurement report may be transmitted in accordance with the measurement report configuration.

A method for wireless communications at a network entity is described. The method may include transmitting, to a UE, first control signaling identifying, of a set of multiple cell groups configured at the UE, an inter-cell mobility configuration for a set of cell groups, where each cell group of the set of multiple cell groups includes a PCell and zero or more SCells, receiving, from the UE, a measurement report for each cell group of the set of cell groups for inter-cell mobility, and transmitting, at least in part in response to receiving the measurement report, second control signaling activating or deactivating a PCell group for inter-cell mobility from one or more cell groups of the set of cell groups.

An apparatus for wireless communications at a network entity is described. The apparatus may include a processor, memory coupled with the processor, and instructions stored in the memory. The instructions may be executable by the processor to cause the apparatus to transmit, to a UE, first control signaling identifying, of a set of multiple cell groups configured at the UE, an inter-cell mobility configuration for a set of cell groups, where each cell group of the set of multiple cell groups includes a PCell and zero or more SCells, receive, from the UE, a measurement report for each cell group of the set of cell groups for inter-cell mobility, and transmit, at least in part in response to receiving the measurement report, second control signaling activating or deactivating a PCell group for inter-cell mobility from one or more cell groups of the set of cell groups.

Another apparatus for wireless communications at a network entity is described. The apparatus may include means for transmitting, to a UE, first control signaling identifying, of a set of multiple cell groups configured at the UE, an inter-cell mobility configuration for a set of cell groups, where each cell group of the set of multiple cell groups includes a PCell and zero or more SCells, means for receiving, from the UE, a measurement report for each cell group of the set of cell groups for inter-cell mobility, and means for transmitting, at least in part in response to receiving the measurement report, second control signaling activating or deactivating a PCell group for inter-cell mobility from one or more cell groups of the set of cell groups.

A non-transitory computer-readable medium storing code for wireless communications at a network entity is described. The code may include instructions executable by a processor to transmit, to a UE, first control signaling identifying, of a set of multiple cell groups configured at the UE, an inter-cell mobility configuration for a set of cell groups, where each cell group of the set of multiple cell groups includes a PCell and zero or more SCells, receive, from the UE, a measurement report for each cell group of the set of cell groups for inter-cell mobility, and transmit, at least in part in response to receiving the measurement report, second control signaling activating or deactivating a PCell group for inter-cell mobility from one or more cell groups of the set of cell groups.

In some examples of the method, apparatuses, and non-transitory computer-readable medium described herein, transmitting the first control signaling identifying the inter-cell mobility configuration may include operations, features, means, or instructions for transmitting, for each cell group of the set of multiple cell groups, a respective set of communication parameters for the cell group.

In some examples of the method, apparatuses, and non-transitory computer-readable medium described herein, transmitting the respective sets of communication parameters may include operations, features, means, or instructions for transmitting a first set of communication parameters for a first cell group of the set of multiple cell groups and transmitting a second set of communication parameters for a second cell group of the set of multiple cell groups, the second set of communication parameters including one or more offsets relative to the first set of communication parameters.

In some examples of the method, apparatuses, and non-transitory computer-readable medium described herein, the respective sets of communication parameters include a bandwidth part indication, a cell index associated with a respective cell group, one or more SSB measurements, timing information, or a combination thereof.

In some examples of the method, apparatuses, and non-transitory computer-readable medium described herein, transmitting the first control signaling identifying the inter-cell mobility configuration may include operations, features, means, or instructions for transmitting a first indication configuring one or more SCells of the set of multiple cell groups with a PCell capability.

In some examples of the method, apparatuses, and non-transitory computer-readable medium described herein, transmitting the second control signaling may include operations, features, means, or instructions for transmitting a second indication for at least one activated cell group, the second indication updating the PCell to be a SCell and a SCell of the zero or more SCells to be a PCell, the second indication in accordance with the PCell capability.

In some examples of the method, apparatuses, and non-transitory computer-readable medium described herein, the first control signaling includes, for each cell group of the set of multiple cell groups, an indication of whether the cell group may be enabled or disabled for inter-cell mobility and the second control signaling changes the indication associated with one or more cell groups of the set of multiple cell groups to activate or deactivate the one or more cell groups.

Some examples of the method, apparatuses, and non-transitory computer-readable medium described herein may further include operations, features, means, or instructions for transmitting a set of indicators corresponding to the set of multiple cell groups, each indicator of the set of indicators identifying whether to release a respective cell group of the set of multiple cell groups, including the one or more cell groups.

Some examples of the method, apparatuses, and non-transitory computer-readable medium described herein may further include operations, features, means, or instructions for transmitting a set of indicators corresponding to the set of cell groups for use at the UE for inter-cell mobility, each indicator of the set of indicators identifying whether to release a respective cell group of at least one cell group for use at the UE for inter-cell mobility.

Some examples of the method, apparatuses, and non-transitory computer-readable medium described herein may further include operations, features, means, or instructions for transmitting third control signaling identifying a list of indices corresponding to the set of cell groups for use at the UE for inter-cell mobility, each index of the list of indices corresponding to a respective cell group of the set of cell groups, where the set of indicators may be compared to the list of indices to activate or deactivate the one or more cell groups for inter-cell mobility.

In some examples of the method, apparatuses, and non-transitory computer-readable medium described herein, the first control signaling includes RRC signaling, and the second control signaling includes a DCI message or a MAC-CE.

Some examples of the method, apparatuses, and non-transitory computer-readable medium described herein may further include operations, features, means, or instructions for transmitting, to the UE, a measurement report configuration indicating one or more measurements to include in the measurement report for the set of cell groups, where the measurement report may be transmitted in accordance with the measurement report configuration.

DETAILED DESCRIPTION

Figure 1:
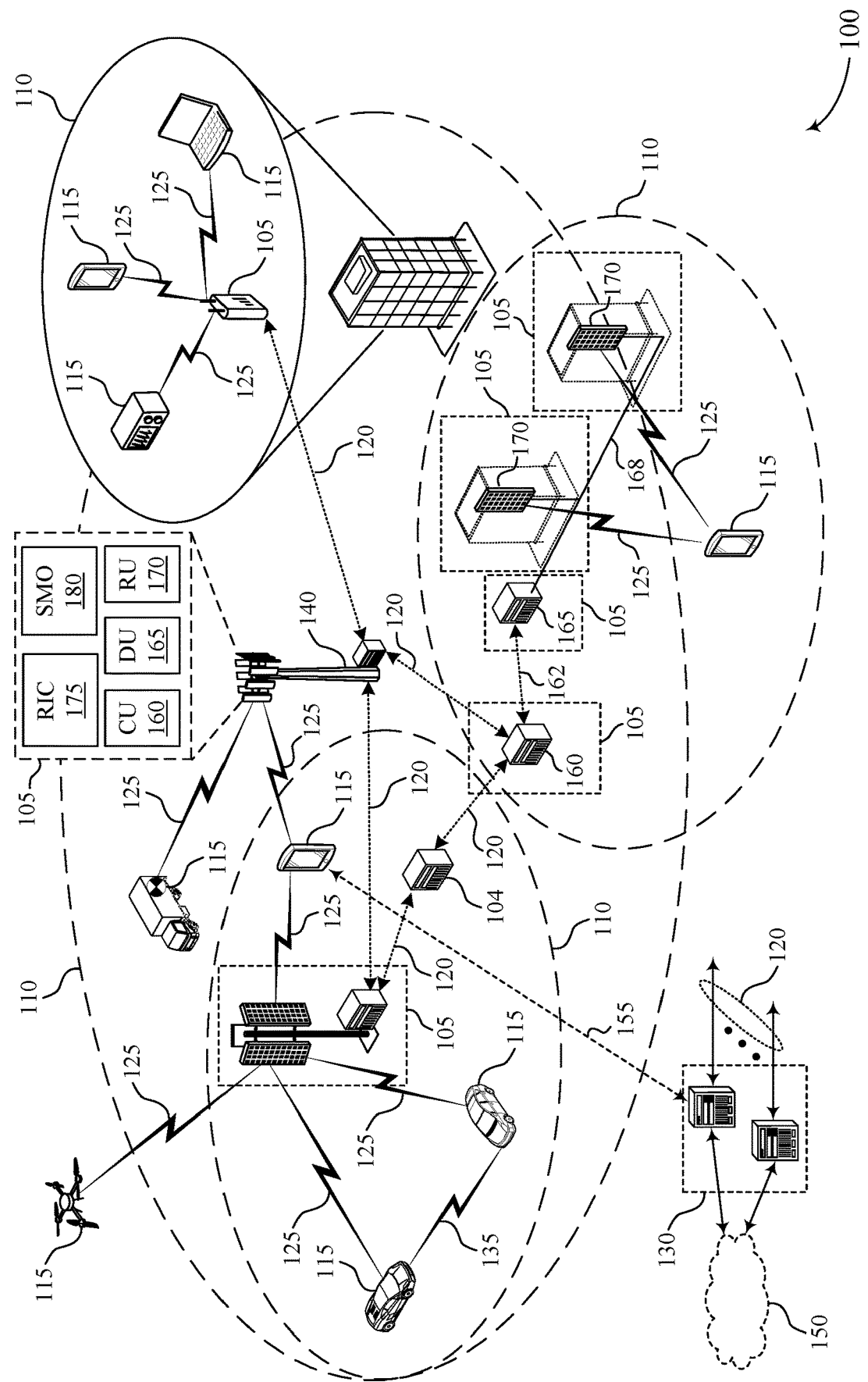
FIG. 1 illustrates an example of a wireless communications system that supports group based cell configuration for inter-cell mobility in accordance with one or more aspects of the present disclosure.

In some examples of wireless communications, a user equipment (UE) may communicate with a network entity via one or more cells, associated with the network entity and configured for layer 1 (L1) mobility, layer 2 (L2) mobility, both. In some examples, the UE may be configured to communicate with multiple groups of cells, where each of the groups of cells may contain a primary cell (e.g., primary cell (PCell) or primary secondary cell (PSCell)) and zero or more secondary cells (SCells). As used herein, primary cell and/or PCell may be, refer to, or include one or both of a primary cell (PCell) or a primary secondary cell (PSCell). In some cases, one or more of the configured groups of cells may be activated (e.g., enabled) for inter-cell mobility while one or more other groups of cells may be deactivated (e.g., disabled, or otherwise not enabled) for inter-cell mobility. For example, a first group of cells may be activated for use at the UE while a second group of cells may be deactivated, and as such the UE may communicate with the network via the first group of cells and refrain from communicating via the second group of cells.

In some examples, each of the groups of cells may be associated with a geographic location. As such, as the UE moves, the network entity may update the configure the UE to activate or deactivate one or more groups of cells for use in communication. In some examples, signaling related to updating groups of cells may be received at or otherwise provided to the UE via radio resource control (RRC) signaling (e.g., via layer 3 (L3)). In some cases, however, L3 communications may not satisfy latency requirements and traffic conditions associated with the network.

The network may reduce latency associated with updating groups of cells according to the techniques described herein. For example, the UE may receive from the network entity an RRC signal configuring one or multiple groups of cells enabled with L1, mobility, L2 mobility, or both. Based on configuring the groups of cells via RRC, the network entity may use L1 messaging, L2 messaging, or both to indicate cell group updates. For example, the network may transmit signaling (e.g., via L1 or L2 signaling, which as used herein may refer to L1, or L2, or some combination of L1 and L2, signaling) activating one or more groups of cells or deactivating one or more groups of cells. In some examples, the network entity may also update the PCell used for a group of cells. For example, an SCell in a group of cells may be updated for use as a PCell and an active PCell of the group of cells may be updated for use as an SCells.

In some examples, the network entity may transmit control signaling via L1 or L2 that removes one or more groups of configured cells from the multiple groups of cells configured with L1 and L2 mobility. For example, as part of the RRC signal, the network entity may configure a mobility release list associated with the multiple groups of cells.

In some examples, each group of cells may have an associated set of communication parameters. In some examples, the network entity may configure a first group cells with a first set of parameters and configure a second group of cells with a second set of parameters via a delta configuration with reference to the first set of parameters. For example, the delta configuration may indicate an offset of the second set of parameters relative to the first set of parameters.

Aspects of the disclosure are initially described in the context of wireless communications systems. Aspects of the disclosure are further illustrated by and described with reference to cell group removal schemes and process flows. Aspects of the disclosure are further illustrated by and described with reference to apparatus diagrams, system diagrams, and flowcharts that relate to group based cell configuration for inter-cell mobility.

FIG. 1 illustrates an example of a wireless communications system 100 that supports group based cell configuration for inter-cell mobility in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), L2) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as L1 (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support group based cell configuration for inter-cell mobility as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels.

The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

In some examples of wireless communications system 100, a UE 115 may communicate with a network entity 105 via one or more cells, associated with the network entity 105 and configured for L1 and L2 mobility. In some examples, the UE 115 may be configured to communicate with multiple groups of cells, where each of the groups of cells may contain a PCell and zero or more SCells. In some cases, one or more of the configured groups of cells may be activated (e.g., enabled) for inter-cell mobility while one or more other groups of cells may be deactivated (e.g., disabled, or otherwise not enabled) for inter-cell mobility. In some examples, each of the groups of cells may be associated with a geographic location. As such, as the UE 115 moves, the network entity 105 may update the configure the UE 115 to activate or deactivate one or more groups of cells for use in communication.

The wireless communications system 100 may reduce latency associated with updating groups of cells according to the techniques described herein. For example, the UE 115 may receive from the network entity 105 an RRC signal configuring multiple groups of cells enabled with L1 and L2 mobility. Based on configuring the groups of cells via RRC, the network entity 105 may use L1 or L2 messaging to indicate cell group updates. For example, the network may transmit signaling (e.g., via L1 or L2) activating one or more groups of cells or deactivating one or more groups of cells. In some examples, the network entity 105 may also update the PCell used for a group of cells. For example, an SCell in a group of cells may be updated for use as a PCell and an active PCell of the group of cells may be updated for use as an SCell.

In some examples, the network entity 105 may transmit control signaling that removes one or more groups of configured cells from the multiple groups of cells configured with L1 and L2 mobility. For example, as part of the RRC signal, the network entity 105 may configure a mobility release list associated with the multiple groups of cells. In some examples, each group of cells may have an associated set of communication parameters. In some examples, the network entity 105 may configure a first group cells with a first set of parameters and configure a second group of cells with a second set of parameters via a delta configuration with reference to the first set of parameters. For example, the delta configuration may indicate an offset of the second set of parameters relative to the first set of parameters.

In some examples, L1 and L2 based inter-cell mobility may be applicable to one or more communication techniques. For example, the techniques described herein may be used for, standalone communications, carrier aggregation, new radio dual connectivity (NR-DC), intra-DU 165 cases, intra-CU 160 inter-DU 165 cases (e.g., for standalone communication and carrier aggregation cases), intra-frequency, inter-frequency, frequency one (FR1) bandwidths, frequency two (FR2) bandwidths, synchronized cells, non-synchronized cells, or any combination thereof.

Figure 2:
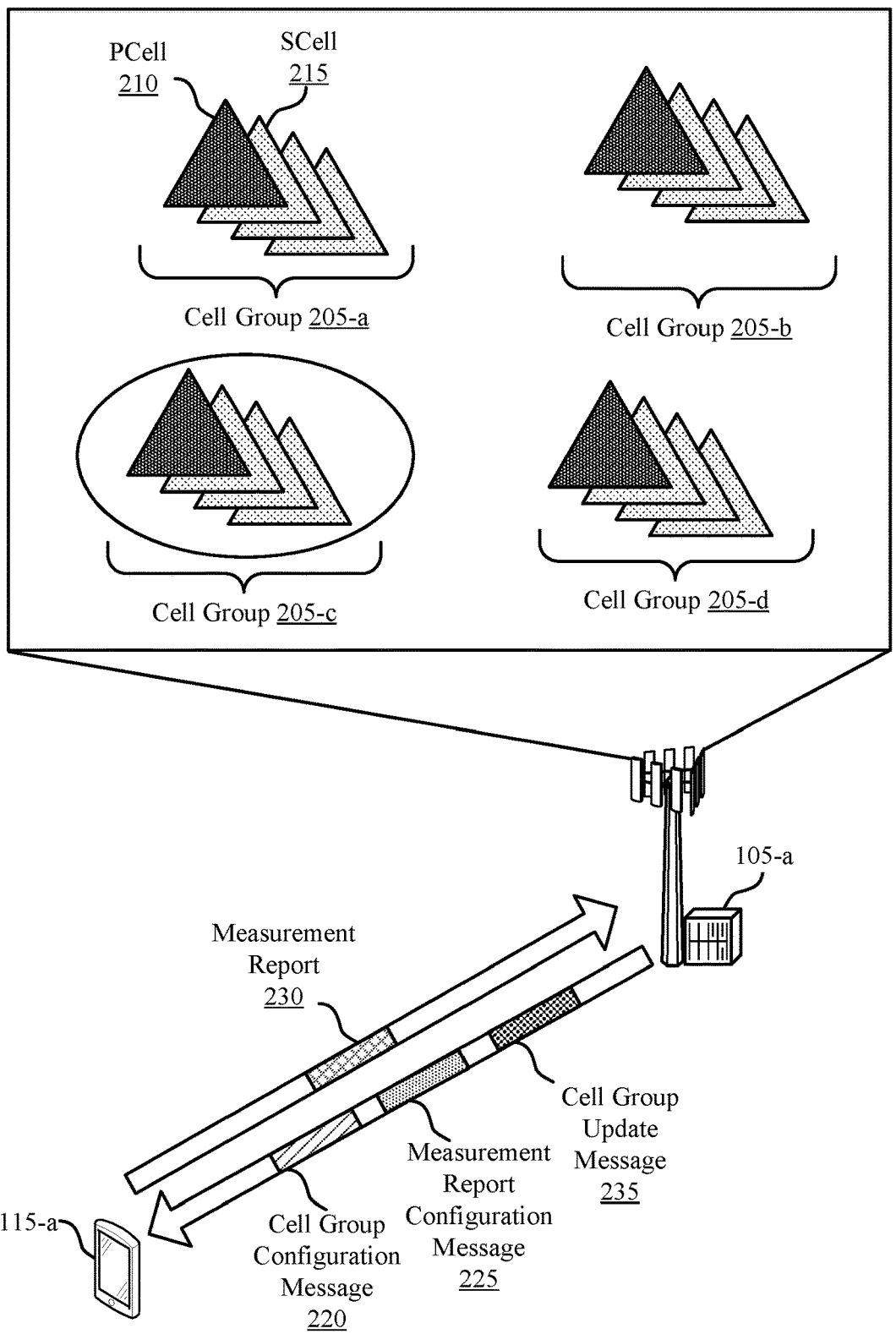
FIG. 2 illustrates an example of a wireless communications system that supports group based cell configuration for inter-cell mobility in accordance with one or more aspects of the present disclosure.

FIG. 2 illustrates an example of a wireless communications system 200 that supports group based cell configuration for inter-cell mobility in accordance with one or more aspects of the present disclosure. In some examples, wireless communications system 200 may implement one or more aspects of wireless communications system 100. For instance, a UE 115-a and a network entity 105-a may be respective examples of a UE 115 and a network entity 105 as described with reference to FIG. 1. While examples are discussed herein, any number of devices and device types may be used to accomplish implementations described in the present disclosure.

As illustrated in FIG. 2, the network entity 105-a may be associated with one or more cell groups 205 that may be configured for L1 and L2 mobility (e.g., as part of a CellGroupConfig). In some cases, each cell group may include at least one PCell 210 and zero or more SCells 215. In some examples, a PCell 210 may be used for communication of control information (e.g., system information blocks (SIBs) via a physical control channel). As such, the UE 115-a may communicate with the network entity 105-a via one or more cells of the one or more cell groups 205. For example, the network entity 105-a may transmit a cell group configuration message 220 (e.g., via RRC) to the UE 115-a, configuring cell groups 205 205-a, 205-b, 205-c, and 205-d for use at the UE 115-a. In some cases, each of the cells groups may be associated with a same DU 165 of the network entity 105-a or different DUs 165 of the network entity 105-a.

Additionally, or alternatively, each cell group 205 may be further characterized into activated cells and deactivated cells. For example, as illustrated if FIG. 2 cell group 205-c may be an example of an activated cell group and cells groups 205-a, 205-b, and 205-d may be an example of deactivated cells groups. In some cases, an activated cell group may be readily used to for data and control information transmissions and a deactivated cell group may be readily activated via L1 and L2 signaling. Additionally, or alternatively, when the UE 115-a connects to a cell group 205, the UE 115-a may connect to each cell of the cell group 205 (e.g., carrier aggregation).

In some examples, each of the cell groups 205 may be associated with a geographic location. As such, as the UE 115-a moves, the network entity 105-a may update which cell groups 205 are activated or deactivated for use at the UE 115-a. In some cases, signaling related to updating cell groups 205 may be done via RRC signaling (e.g., via L3). In some cases, however, L3 communications may not satisfy latency and traffic conditions associated with the network. As such, it may be advantageous to use other communication layers when updating parameters associated with the multiple groups of cells.

The wireless communications system 200 may reduce latency associated with updating cell groups 205 according to the techniques described herein. For example, the UE 115-a may receive from the network entity 105-a the cell group configuration message 220 (e.g., via an RRC signal) configuring the multiple cell groups 205 enabled with L1 and L2 mobility. In some cases, the network entity 105-a may include each cell group 205 eligible for activation via L1 and L2 signaling in a cell group configuration list (e.g., L1L2MobilityCellGroupConfigList) as part of the cell group configuration message 220. In some examples, the L1L2MobilityCellGroupConfigList may associate each cell group 205 with a respective cell group ID (e.g., CellGroupID configured in CellGroupConfig).

Additionally, or alternatively, the cell group configuration message 220 may indicate an associated set of communication parameters for each of the cells groups 205.

For instance the communication parameters may include bandwidth part indication, a cell index associated with the respective cell groups 205, one or more synchronization signal block (SSB) measurements, timing information, or a combination thereof. In some examples, the network entity 105-a may configure each of the respective set of parameters in accordance with a delta configuration. For example, the network entity 105-a may configure the cell group 205-a with a first set of parameters and configure cell group 205-b with a second set of parameters via a delta configuration with reference to the first set of parameters. For instance, the delta configuration may indicate that the second set of parameters shares a first subset of parameters with the first set of parameters (e.g., a same bandwidth part and timing information) but configures a second subset of different parameters (e.g., different SSB measurements and a different cell index).

Additionally, or alternatively, the cell group configuration message 220 may configure one or more SCells 215 in each cell group 205 with a PCell configuration (e.g., l1l2MobilityConfig). For example, each SCell 215 in a cell group 205 may be individually configured with a PCell configuration such that a given SCell 215 may updated to a PCell 210 for that cell group 205 based on receiving signaling from the network entity 105-a (e.g., L1 or L2 signaling).

In some examples, as the UE 115-a moves within the geographic area, a link quality associated with the various cell groups 205 may change. As such, the UE 115-a may perform one or more quality measurements (e.g., periodically or on a semi-persistent basis) on each cell group 205 configured for L1 and L2 mobility. For example, the network entity 105-a may transmit to the UE 115-a a measurement report configuration message 225 that may indicate one or more measurements to include in a measurement report for each of cells groups 205. In some examples, the UE 115-a may include the one or more measurements in a measurement report 230 and transmit the measurement report 230 to the network entity 105-a in accordance with the measurement report configuration message 225.

Based on receiving the measurement report 230, the network entity 105-a may determine how to update cell group 205 activity at the UE 115-a. For example, the measurement report 230 may indicate that an associated link quality with cell group 205-c has decreased below a configured threshold while an associated link quality with cell group 205-b has increased above the configured threshold. As such, the network entity 105-a may transmit a cell group update message 235. In some examples, the cell group update message 235 may be an example of an L1 or L2 signaling that indicates an activation status of the configured cell group. In some examples, the UE 115-a may be configured to have one cell group activated at a time, and as such, the cell group update message 235 may activate cell group 205-b for use at the UE 115-a and deactivate cell group 205-c from use at the UE 115-a (e.g., a cell group switch). Additionally, or alternatively, the UE 115-a may be configured to support multiple activated cell groups 205 at a time (e.g., based on UE 115-a capability) and as such, the cell group update message 235 may activate cell group 205-b configuring communications via cell group 205-b or 205-c at the UE 115-a.

In some examples, the cell group update message 235 may include a PCell update indication. For example, the cell group update message 235 may indicate to update an SCell 215 of cell group 205-c as the PCell 210 of cell group 205-c and to update the current PCell 210 to an SCell 215.

In some examples, the wireless communications system 200 may support signaling to remove cell groups 205 configured as part of the L1L2MobilityCellGroupConfigList. For example, the as part of the cell group configuration message 220, the network entity 105-a may include an L1 and L2 mobility parameter (e.g., L1L2MobilityEnabler) for each respective cell group configuration (e.g., CellGroupConfig). For example, a CellGroupConfig for a given cell group 205 may include a respective L1L2MobilityEnabler. If the L1L2MobilityEnabler for a given cell group 205 is enabled, then the given cell group 205 may be configured as part of the L1 and L2 mobility cell set. If the L1L2MobilityEnabler for a given cell group is disabled, then the given cell group may not be configured as part of the L1 and L2 mobility cell set.

Additionally, or alternatively, the network entity 105-a may enable or disable L1 and L2 mobility for a cell group 205 outside of the cell group configuration for a given cell group 205 (e.g., outside of CellGroupConfig). For example, as part of the cell configuration message 220, the network entity 105-a may configure an L1 and L2 mobility release list (e.g., L1L2MobilityCellGroupToReleaseList) that includes a respective indicator associated with one or more of the cell groups 205 that enables or disables a given cell group 205. In some examples, the L1L2MobilityCellGroupToReleaseList may include a list of each cell group configured as part of the CellGroupConfig, where a given indicator may be associated with a CellGroupID from the CellGroupConfig.

Additionally, or alternatively, the L1L2MobilityCellGroupToReleaseList may include cell groups 205 part of a cell group L1 and L2 mobility index (e.g., CellGroupL1L2MobilityIndex) where a given indicator may be associated with a cell group ID from the CellGroupL1L2MobilityIndex. Further discussion of the use of the L1L2MobilityCellGroupToReleaseList to enable or disable cell groups 205 is described herein, including with reference to FIG. 3.

Figure 3:
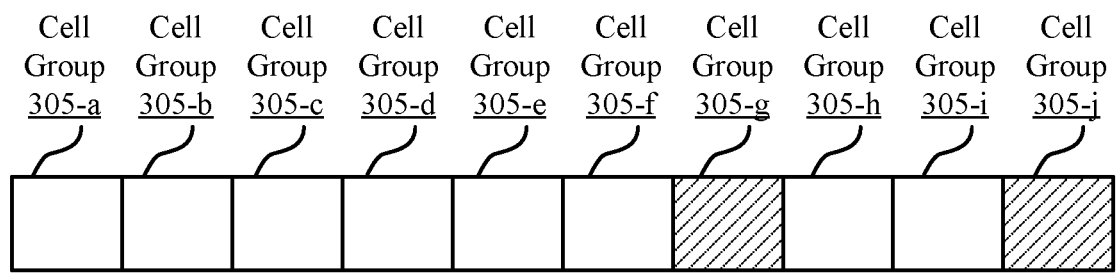
FIG. 3 illustrates an example of cell group removal schemes that supports group based cell configuration for inter-cell mobility in accordance with one or more aspects of the present disclosure.
Figure 3:
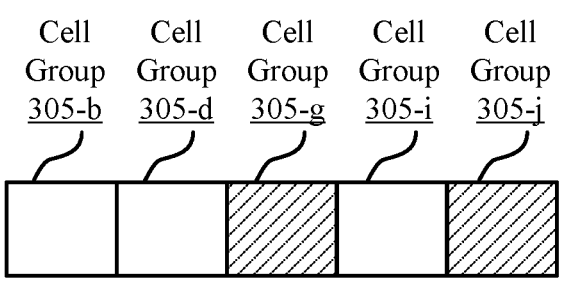
Figure 3:

FIG. 3 illustrates examples of a cell group removal schemes 300-a and 300-b that supports group based cell configuration for inter-cell mobility in accordance with one or more aspects of the present disclosure. In some examples, cell group removal schemes 300-a and 300-b may implement one or more aspects of wireless communications system 100 or wireless communications system 200. For instance, a cell group 305 may be an example of a cell group 205 with reference to FIG. 2. While examples are discussed herein, any number of devices and device types may be used to accomplish implementations described in the present disclosure.

In some examples, cell group removal schemes 300-a and 300-b may be respective implementations of the L1L2MobilityCellGroupToReleaseList with reference to FIG. 2. For example, a network entity 105 may transmit to a UE 115 either cell group removal scheme 300-a or 300-b, indicating to enable or disable one or more cell groups 305 for use in L1 and L2 mobility.

In some examples, cell group removal scheme 300-a may be associated with each cell group 305 included within an initial cell group configuration at the UE 115 (e.g., CellGroupConfig configured via RRC signaling with reference to FIG. 2). For example, the UE 115 may be initially configured with cell groups 305-a, 305-b, 305-c, 305-d, 305-e, 305-f, 305-g, 305-h, 305-i, and 305-j. As such, the cell group removal scheme 300-a may include a set of indicators where each indicator corresponds to a respective cell group 305 of the cell groups 305-a through 305-j. In some examples, each indicator may be associated with a CellGroupID for a given cell group 305 reused from the CellGroupConfig. In some examples, each indicator of the set of indicators may identify whether to release a respective cell group 305 from use at the UE 115. For example, the cell group removal scheme 300-a may include a cell removal indication 310 for cells group 305-g and 305-j. Based on receiving an indication of the cell group removal scheme 300-a, the UE 115 may remove cell groups 305-g and 305-j from use in L1 and L2 mobility operations.

Additionally, or alternatively, cell group removal scheme 300-b may be associated with a subset of cell groups 305 configured at the UE 115. In some examples, the subset of cell groups 305 may be included in a L1 and L2 mobility list (e.g., CellGroupL1L2MobilityIndex). In some examples, the CellGroupL1L2MobilityIndex may include cell groups 305 configured with l1L2MobilityConfig (e.g., with reference to FIG. 2). For example, as illustrated in FIG. 3, the UE 115 may be configured with cell groups 305-a through 305-j via CellGroupConfig where cell groups 305-b, 305-d, 305-g, 305-i, and 305-j are further configured with l1L2MobilityConfig and may be included in the CellGroupL1L2MobilityIndex. In some examples, the cell group removal scheme 300-b may have a list of indicators of length maxNrofCellGroupsL1L2Mobility which may be the maximum number of cell groups 305 that are configured with L1L2MobilityConfig. As such, each indicator of the list of indicators may be associated with a respective cell group included in CellGroupL1L2MobilityIndex. In some examples, each indicator of the list of indicators may identify whether to release a respective cell group 305 from use at the UE 115. For example, the cell group removal scheme 300-b may include a cell removal indication 310 for cell groups 305-g and 305-j. Based on receiving an indication of the cell group removal scheme 300-b, the UE 115 may remove cell groups 305-g and 305-j from use in L1 and L2 mobility operations. Based on cell group removal scheme 300-b including indicators for fewer cell groups 305, the cell group removal scheme 300-b may benefit from a reduction in cell removal errors.

Figure 4:
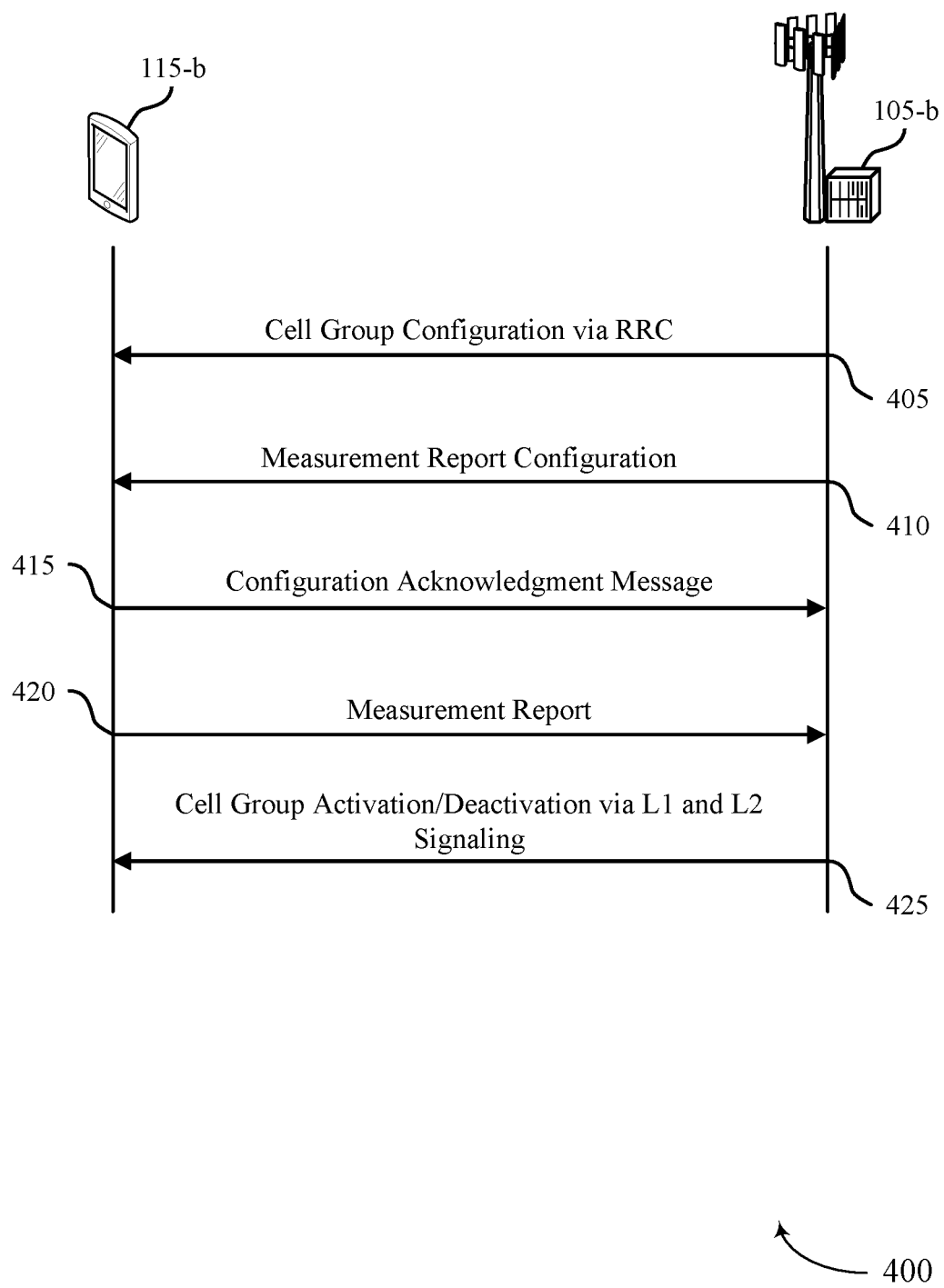
FIG. 4 illustrates an example of a process flow that supports group based cell configuration for inter-cell mobility in accordance with one or more aspects of the present disclosure.

FIG. 4 illustrates an example of a process flow 400 that supports group based cell configuration for inter-cell mobility in accordance with one or more aspects of the present disclosure. In some examples, process flow 400 may implement aspects of wireless communications system 100, wireless communications system 200, cell group removal schemes 300-a and 300-b, or a combination thereof. Process flow 400 includes a UE 115-b and a network entity 105-b which may be respective examples of a UE 115 and a network entity 105, as described with reference to FIGS. 1 through 3. Alternative examples of the following may be implemented, where some steps are performed in a different order than described or are not performed at all. In some cases, steps may include additional features not mentioned below, or further steps may be added. In addition, while process flow 400 shows processes between a single UE 115 and a single network entity 105, it should be understood that these processes may occur between any number of network devices and network device types.

At 405, the UE 115-*b* may receive from the network entity 105-*b* first control signaling identifying, of a set of cell groups configured at the UE 115-*b*, an inter-cell mobility configuration for a set of cell groups for use at the UE 115-*b*. In some examples, each cell group of the set of cell groups may include a PCell and zero or more SCells. In some examples, the first control signaling may be an example of RRC signaling. In some examples first control signaling may include, for each cell group of the set of cell groups, an indication of whether the cell group is enabled or disabled for inter-cell mobility As part of the first control signaling, the UE 115-*b* may receive, for each cell group of the set of cell groups, a respective set of communication parameters for the cell group. In some examples, the UE 115-*b* may receive a first set of communication parameters for a first cell group of the set of cell groups and receive a second set of communication parameters for a second cell group of the set of cell groups. In some examples, the second set of communication parameters may include one or more offsets relative to the first set of communication parameters (e.g., a delta configuration, with reference to FIG. 2). The respective sets of communication parameters may include a bandwidth indication, a cell index associated with a respective cell group, one or more SSB measurements, timing information, or a combination thereof.

In some examples, the first control signaling may include receiving a first indication configuring one or more SCells of the set of cell groups with a PCell capability (e.g., l1L2MobilityConfig).

In some examples, the UE 115-*b* may receive a set of indicators corresponding to the set of cell groups (e.g., L1L2MobilityCellGroupToReleaseList, with reference to cell group removal scheme 300-*a*). In such examples, each indicator of the set of indicators may identify whether to release a respective cell group of the set of cell groups, including the one or more cell groups.

In some examples, the UE 115-*b* may receive a set of indicators corresponding to the set of cell groups for use at the UE 115-*b* for inter-cell mobility (e.g., L1L2MobilityCellGroupToReleaseList, with reference to cell group removal scheme 300-*b*). In such examples, each indicator of the set of indicators identifying whether to release a respective cell group of the at least one cell group for use at the UE 115-*b* for inter-cell mobility. The UE 115-*b* may receive control signaling identifying a list of indices corresponding to the set of cell groups for use at the UE 115-*b* for inter-cell mobility (e.g., CellGroupL1L2MobilityIndex). As such, each index of the list of indices may correspond to a respective cell group of the set of cells groups, where the set of indicators may be compared to the list of indices to activate or deactivate the one or more cell groups for inter-cell mobility.

At 410, the UE 115-*b* may receive a measurement report configuration indicating one or more measurements to include in the measurement report for the set of cell groups. In some examples, the UE 115-*b* may receive the first control signaling at 405 and the measurement report configuration at 410 in a single RRC message from the network entity 105-*b*.

At 415, the UE 115-*b* may transmit an acknowledgement message in response to the first control signaling, the measurement report configuration, or both. In some examples, the acknowledgment message may indicate to the network entity 105-*b* that the RRC configuration is complete at the UE 115-*b*.

At 420, the UE 115-*b* may transmit a measurement report for each cell group of the set of cell groups for inter-cell mobility, where the measurement report may be transmitted in accordance with the measurement report configuration.

At 425, the UE 115-*b* may receive, at least in part in response to transmitting the measurement report, second control signaling activating or deactivating a PCell group for inter-cell mobility from one or more cell groups of the set of cell groups. In some examples, the second control signaling may change the indication associated with one or more cell groups of the set of cell groups to activate or deactivate the one or more cell groups. In some examples, the second control signaling may be an example of downlink control information (DCI) or a MAC control element (MAC-CE) signaled via L1 or L2.

In some examples, receiving the second control signaling may include receiving a second indication for the at least one activated cell group, the second indication updating the PCell to be an SCell and an SCell of the zero or more SCells to be a PCell, the second indication in accordance with the PCell capability.

Figure 5:
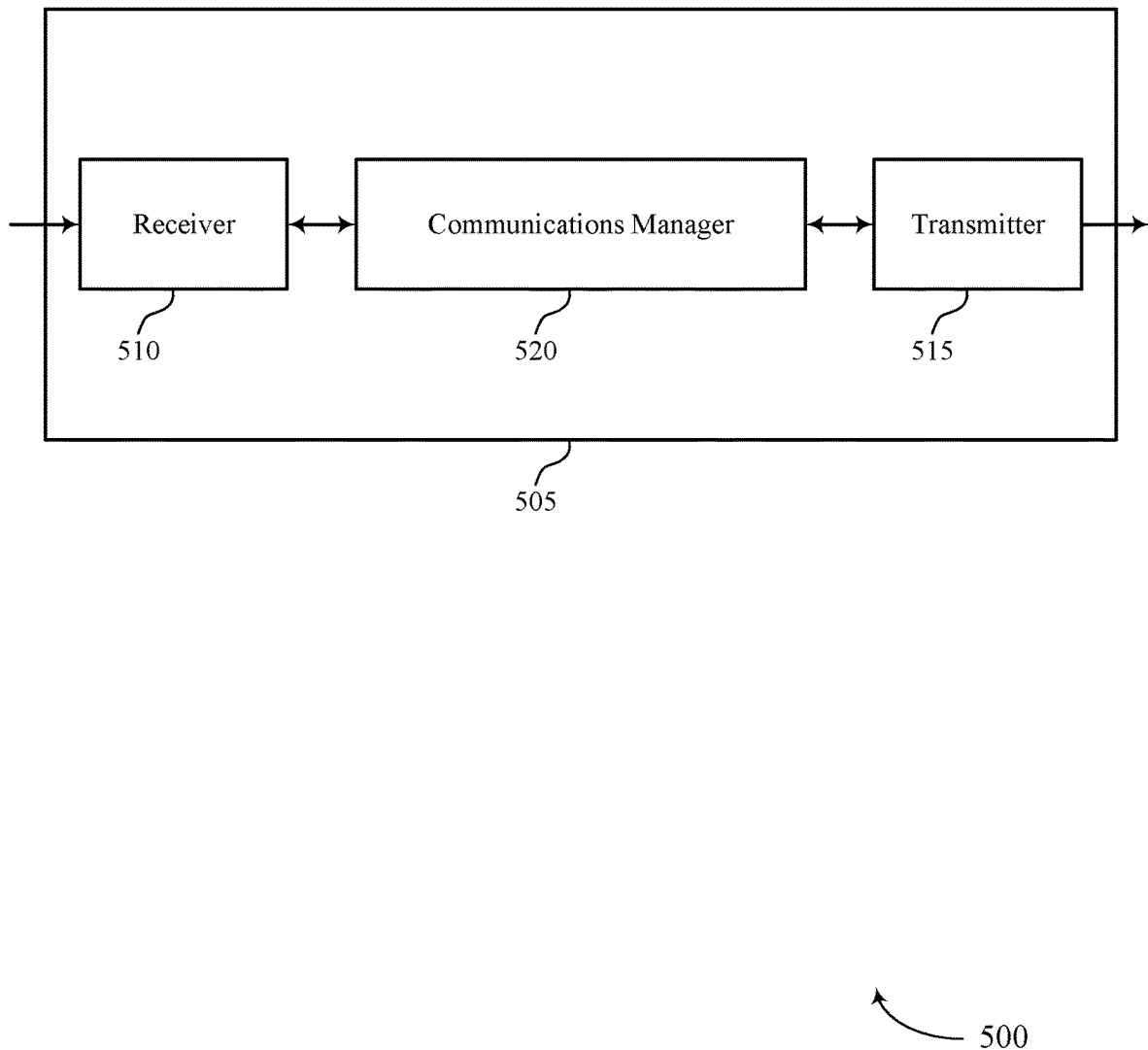
FIGS. 5 and 6 show block diagrams of devices that support group based cell configuration for inter-cell mobility in accordance with one or more aspects of the present disclosure.

FIG. 5 shows a block diagram 500 of a device 505 that supports group based cell configuration for inter-cell mobility in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to group based cell configuration for inter-cell mobility). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to group based cell configuration for inter-cell mobility). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of group based cell configuration for inter-cell mobility as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communications at a UE in accordance with examples as disclosed herein. For example, the communications manager 520 may be configured as or otherwise support a means for receiving first control signaling identifying, of a set of multiple cell groups configured at the UE, an inter-cell mobility configuration for a set of cell groups for use at the UE, where each cell group of the set of multiple cell groups includes a PCell and zero or more SCells. The communications manager 520 may be configured as or otherwise support a means for transmitting a measurement report for each cell group of the set of cell groups for inter-cell mobility. The communications manager 520 may be configured as or otherwise support a means for receiving, at least in part in response to transmitting the measurement report, second control signaling activating or deactivating a PCell group for inter-cell mobility from one or more cell groups of the set of cell groups.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for enhanced inter cell mobility communications with may result in reduced processing, reduced power consumption, and a more efficient utilization of communication resources.

Figure 6:
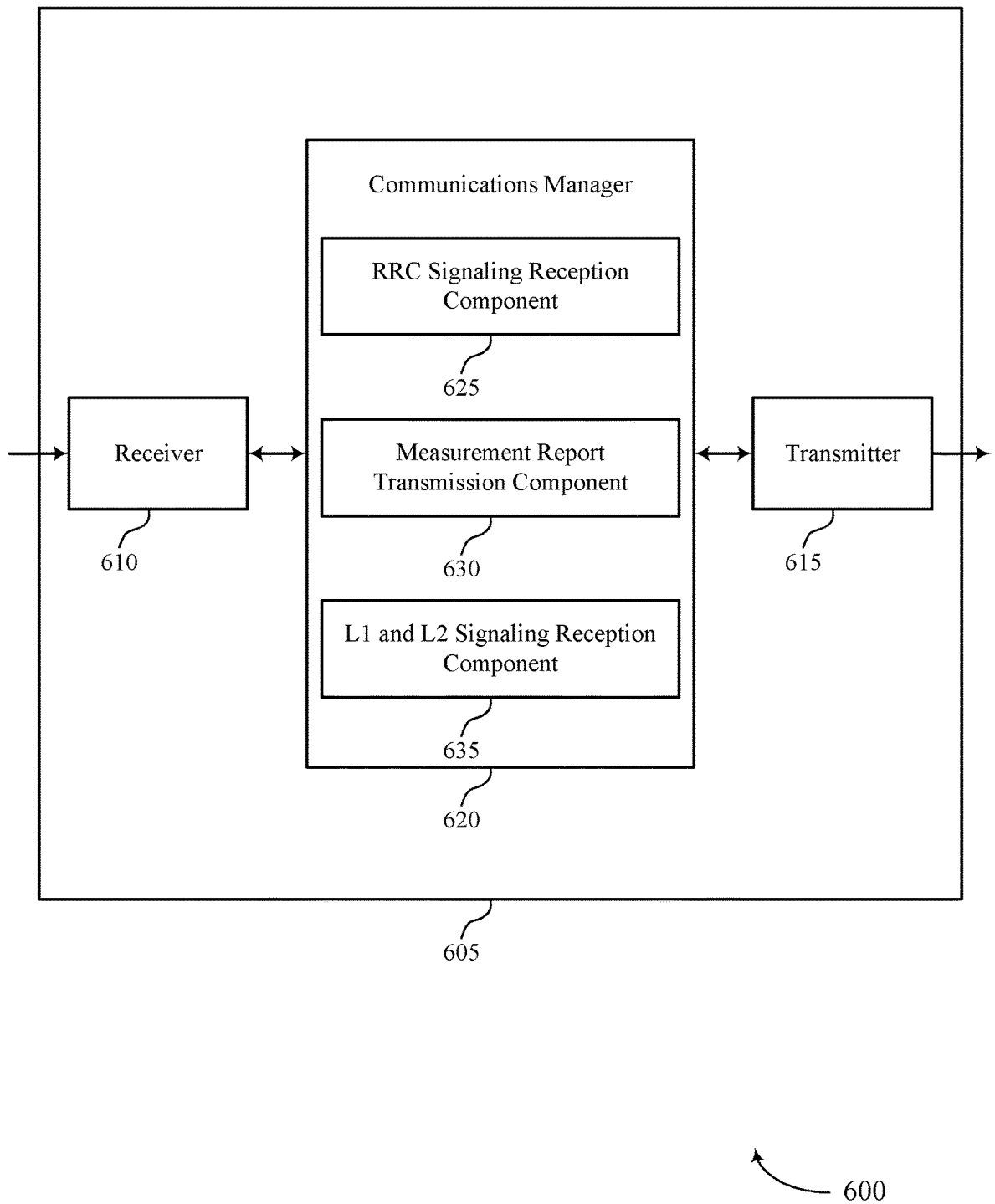

FIG. 6 shows a block diagram 600 of a device 605 that supports group based cell configuration for inter-cell mobility in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to group based cell configuration for inter-cell mobility). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to group based cell configuration for inter-cell mobility). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of group based cell configuration for inter-cell mobility as described herein. For example, the communications manager 620 may include an RRC signaling reception component 625, a measurement report transmission component 630, a L1 and L2 signaling reception component 635, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications at a UE in accordance with examples as disclosed herein. The RRC signaling reception component 625 may be configured as or otherwise support a means for receiving first control signaling identifying, of a set of multiple cell groups configured at the UE, an inter-cell mobility configuration for a set of cell groups for use at the UE, where each cell group of the set of multiple cell groups includes a PCell and zero or more SCells. The measurement report transmission component 630 may be configured as or otherwise support a means for transmitting a measurement report for each cell group of the set of cell groups for inter-cell mobility. The L1 and L2 signaling reception component 635 may be configured as or otherwise support a means for receiving, at least in part in response to transmitting the measurement report, second control signaling activating or deactivating a PCell group for inter-cell mobility from one or more cell groups of the set of cell groups.

Figure 7:
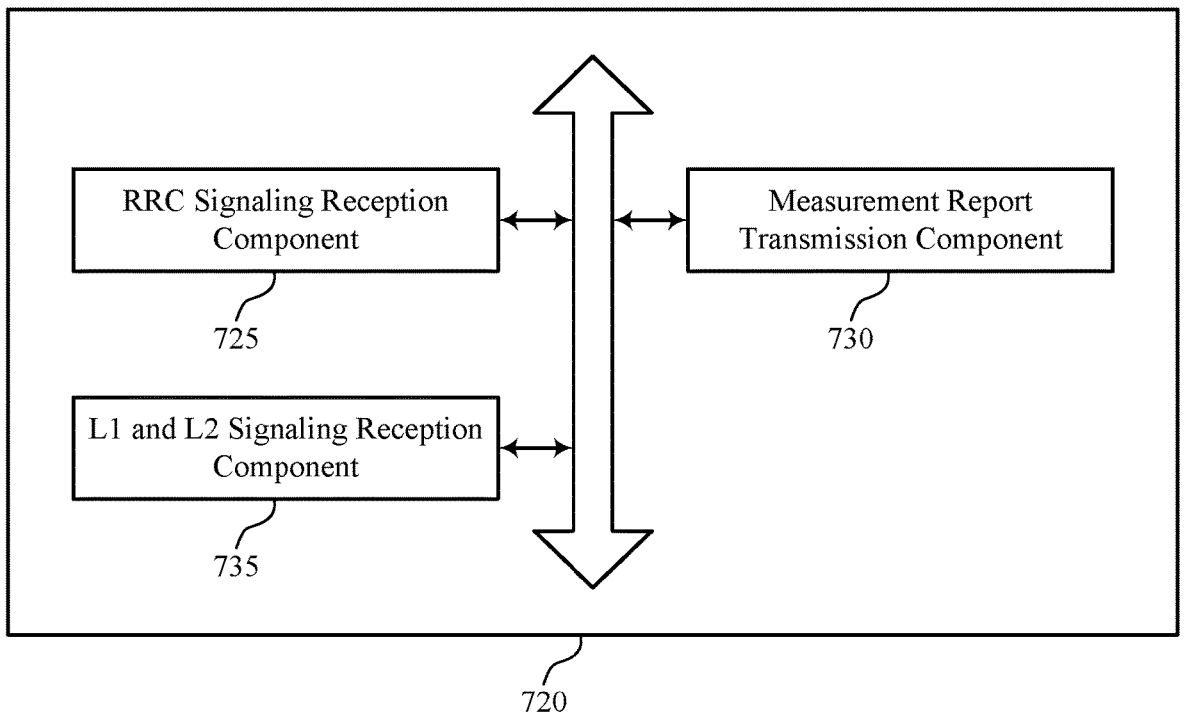
FIG. 7 shows a block diagram of a communications manager that supports group based cell configuration for inter-cell mobility in accordance with one or more aspects of the present disclosure.

FIG. 7 shows a block diagram 700 of a communications manager 720 that supports group based cell configuration for inter-cell mobility in accordance with one or more aspects of the present disclosure. The communications manager 720 may be an example of aspects of a communications manager 520, a communications manager 620, or both, as described herein. The communications manager 720, or various components thereof, may be an example of means for performing various aspects of group based cell configuration for inter-cell mobility as described herein. For example, the communications manager 720 may include an RRC signaling reception component 725, a measurement report transmission component 730, a L1 and L2 signaling reception component 735, or any combination thereof. Each of these components may communicate, directly or indirectly, with one another (e.g., via one or more buses).

The communications manager 720 may support wireless communications at a UE in accordance with examples as disclosed herein. The RRC signaling reception component 725 may be configured as or otherwise support a means for receiving first control signaling identifying, of a set of multiple cell groups configured at the UE, an inter-cell mobility configuration for a set of cell groups for use at the UE, where each cell group of the set of multiple cell groups includes a PCell and zero or more SCells. The measurement report transmission component 730 may be configured as or otherwise support a means for transmitting a measurement report for each cell group of the set of cell groups for inter-cell mobility. The L1 and L2 signaling reception component 735 may be configured as or otherwise support a means for receiving, at least in part in response to transmitting the measurement report, second control signaling activating or deactivating a PCell group for inter-cell mobility from one or more cell groups of the set of cell groups.

In some examples, to support receiving the first control signaling identifying the inter-cell mobility configuration, the RRC signaling reception component 725 may be configured as or otherwise support a means for receiving, for each cell group of the set of multiple cell groups, a respective set of communication parameters for the cell group.

In some examples, to support receiving the respective sets of communication parameters, the RRC signaling reception component 725 may be configured as or otherwise support a means for receiving a first set of communication parameters for a first cell group of the set of multiple cell groups. In some examples, to support receiving the respective sets of communication parameters, the RRC signaling reception component 725 may be configured as or otherwise support a means for receiving a second set of communication parameters for a second cell group of the set of multiple cell groups, the second set of communication parameters including one or more offsets relative to the first set of communication parameters.

In some examples, the respective sets of communication parameters include a bandwidth part indication, a cell index associated with a respective cell group, one or more SSB measurements, timing information, or a combination thereof.

In some examples, to support receiving the first control signaling identifying the inter-cell mobility configuration, the RRC signaling reception component 725 may be configured as or otherwise support a means for receiving a first indication configuring one or more SCells of the set of multiple cell groups with a PCell capability.

In some examples, to support receiving the second control signaling, the L1 and L2 signaling reception component 735 may be configured as or otherwise support a means for receiving a second indication for at least one activated cell group, the second indication updating the PCell to be an SCell and an SCell of the zero or more SCells to be a PCell, the second indication in accordance with the PCell capability.

In some examples, the first control signaling includes, for each cell group of the set of multiple cell groups, an indication of whether the cell group is enabled or disabled for inter-cell mobility. In some examples, the second control signaling changes the indication associated with one or more cell groups of the set of multiple cell groups to activate or deactivate the one or more cell groups.

In some examples, the RRC signaling reception component 725 may be configured as or otherwise support a means for receiving a set of indicators corresponding to the set of multiple cell groups, each indicator of the set of indicators identifying whether to release a respective cell group of the set of multiple cell groups, including the one or more cell groups.

In some examples, the RRC signaling reception component 725 may be configured as or otherwise support a means for receiving a set of indicators corresponding to the set of cell groups for use at the UE for inter-cell mobility, each indicator of the set of indicators identifying whether to release a respective cell group of at least on cell group for use at the UE for inter-cell mobility.

In some examples, the RRC signaling reception component 725 may be configured as or otherwise support a means for receiving third control signaling identifying a list of indices corresponding to the set of cell groups for use at the UE for inter-cell mobility, each index of the list of indices corresponding to a respective cell group of the set of cell groups, where the set of indicators are compared to the list of indices to activate or deactivate the one or more cell groups for inter-cell mobility.

In some examples, the first control signaling includes radio resource control signaling, and the second control signaling includes a DCI message or a MAC-CE.

In some examples, the RRC signaling reception component 725 may be configured as or otherwise support a means for receiving a measurement report configuration indicating one or more measurements to include in the measurement report for the set of cell groups, where the measurement report is transmitted in accordance with the measurement report configuration.

Figure 8:
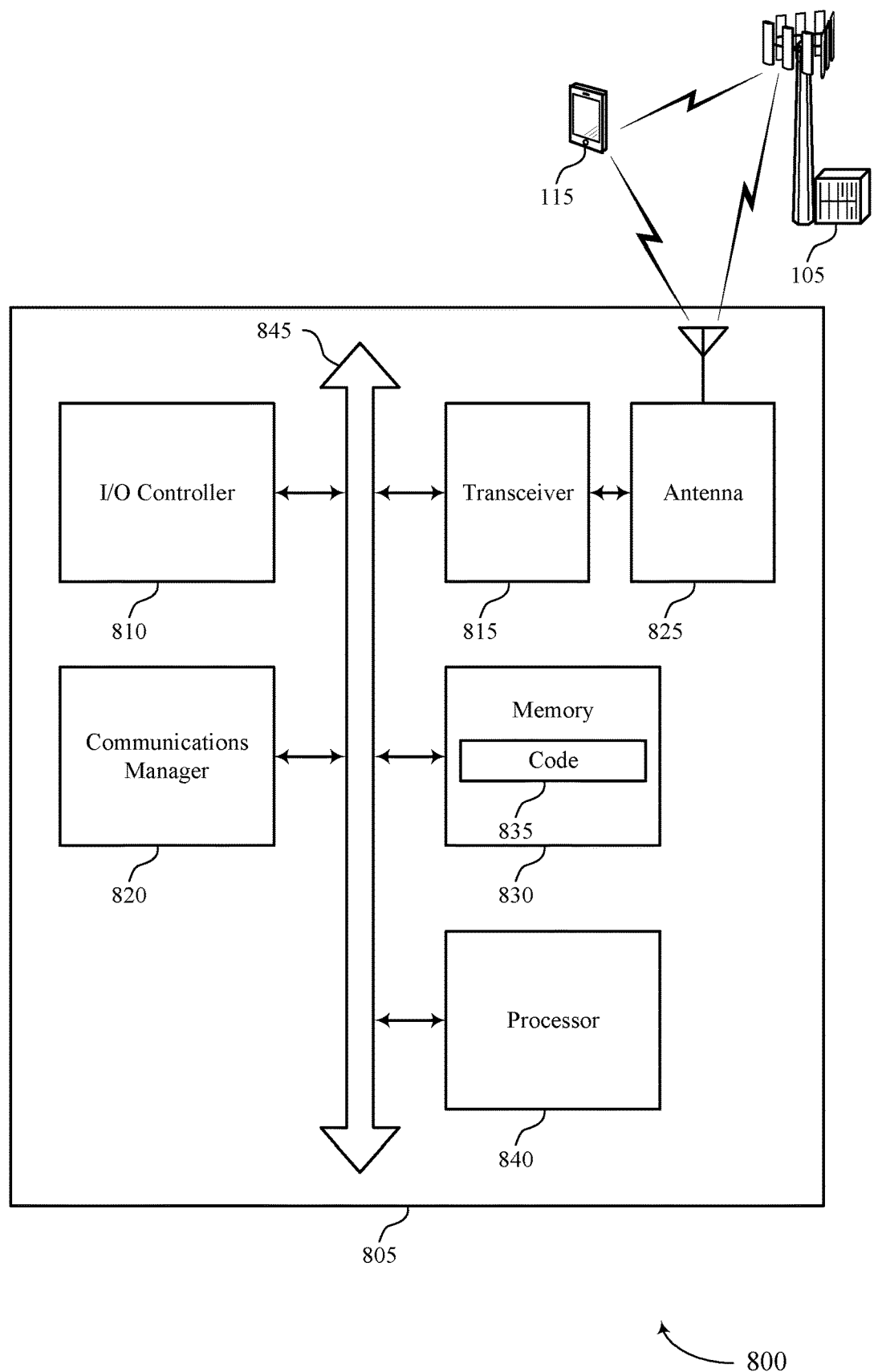
FIG. 8 shows a diagram of a system including a device that supports group based cell configuration for inter-cell mobility in accordance with one or more aspects of the present disclosure.

FIG. 8 shows a diagram of a system 800 including a device 805 that supports group based cell configuration for inter-cell mobility in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting group based cell configuration for inter-cell mobility). For example, the device 805 or a component of the device 805 may include a processor 840 and memory 830 coupled with or to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving first control signaling identifying, of a set of multiple cell groups configured at the UE, an inter-cell mobility configuration for a set of cell groups for use at the UE, where each cell group of the set of multiple cell groups includes a PCell and zero or more SCells. The communications manager 820 may be configured as or otherwise support a means for transmitting a measurement report for each cell group of the set of cell groups for inter-cell mobility. The communications manager 820 may be configured as or otherwise support a means for receiving, at least in part in response to transmitting the measurement report, second control signaling activating or deactivating a PCell group for inter-cell mobility from one or more cell groups of the set of cell groups.

By including or configuring the communications manager 820 in accordance with examples as described herein, the device 805 may support techniques for enhanced inter cell mobility communications with may result in improved communication reliability, reduced latency, improved user experience related to reduced processing, reduced power consumption, more efficient utilization of communication resources, improved coordination between devices, longer battery life, and improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of group based cell configuration for inter-cell mobility as described herein, or the processor 840 and the memory 830 may be otherwise configured to perform or support such operations.

Figure 9:
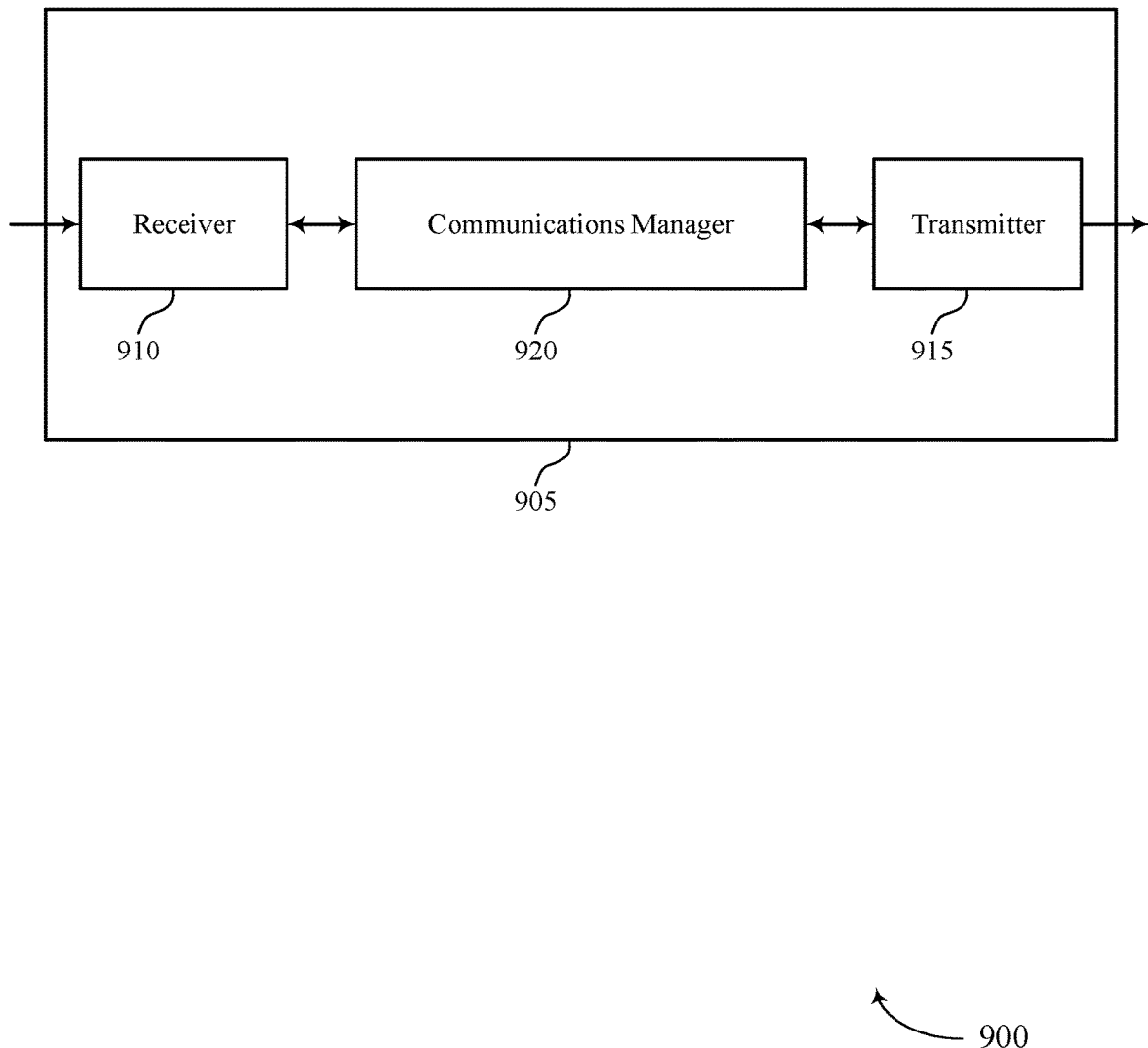
FIGS. 9 and 10 show block diagrams of devices that support group based cell configuration for inter-cell mobility in accordance with one or more aspects of the present disclosure.

FIG. 9 shows a block diagram 900 of a device 905 that supports group based cell configuration for inter-cell mobility in accordance with one or more aspects of the present disclosure. The device 905 may be an example of aspects of a network entity 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The communications manager 920, the receiver 910, the transmitter 915, or various combinations thereof or various components thereof may be examples of means for performing various aspects of group based cell configuration for inter-cell mobility as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communications at a network entity in accordance with examples as disclosed herein. For example, the communications manager 920 may be configured as or otherwise support a means for transmitting, to a UE, first control signaling identifying, of a set of multiple cell groups configured at the UE, an inter-cell mobility configuration for a set of cell groups, where each cell group of the set of multiple cell groups includes a PCell and zero or more SCells. The communications manager 920 may be configured as or otherwise support a means for receiving, from the UE, a measurement report for each cell group of the set of cell groups for inter-cell mobility. The communications manager 920 may be configured as or otherwise support a means for transmitting, at least in part in response to receiving the measurement report, second control signaling activating or deactivating a PCell group for inter-cell mobility from one or more cell groups of the set of cell groups.

By including or configuring the communications manager 920 in accordance with examples as described herein, the device 905 (e.g., a processor controlling or otherwise coupled with the receiver 910, the transmitter 915, the communications manager 920, or a combination thereof) may support techniques for enhanced inter cell mobility communications with may result in reduced processing, reduced power consumption, and a more efficient utilization of communication resources.

Figure 10:
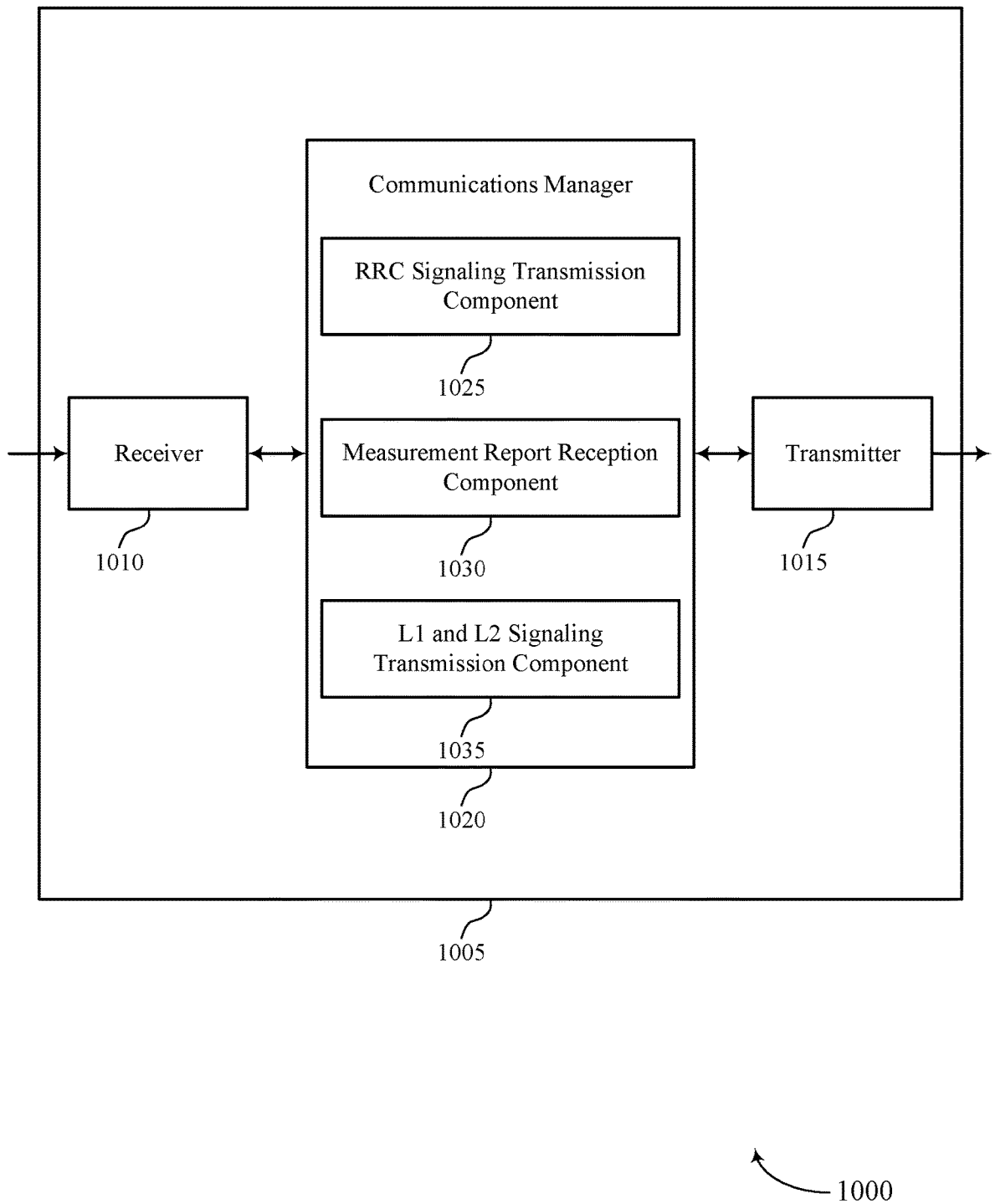

FIG. 10 shows a block diagram 1000 of a device 1005 that supports group based cell configuration for inter-cell mobility in accordance with one or more aspects of the present disclosure. The device 1005 may be an example of aspects of a device 905 or a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The device 1005, or various components thereof, may be an example of means for performing various aspects of group based cell configuration for inter-cell mobility as described herein. For example, the communications manager 1020 may include an RRC signaling transmission component 1025, a measurement report reception component 1030, a L1 and L2 signaling transmission component 1035, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. The RRC signaling transmission component 1025 may be configured as or otherwise support a means for transmitting, to a UE, first control signaling identifying, of a set of multiple cell groups configured at the UE, an inter-cell mobility configuration for a set of cell groups, where each cell group of the set of multiple cell groups includes a PCell and zero or more SCells. The measurement report reception component 1030 may be configured as or otherwise support a means for receiving, from the UE, a measurement report for each cell group of the set of cell groups for inter-cell mobility. The L1 and L2 signaling transmission component 1035 may be configured as or otherwise support a means for transmitting, at least in part in response to receiving the measurement report, second control signaling activating or deactivating a PCell group for inter-cell mobility from one or more cell groups of the set of cell groups.

Figure 11:
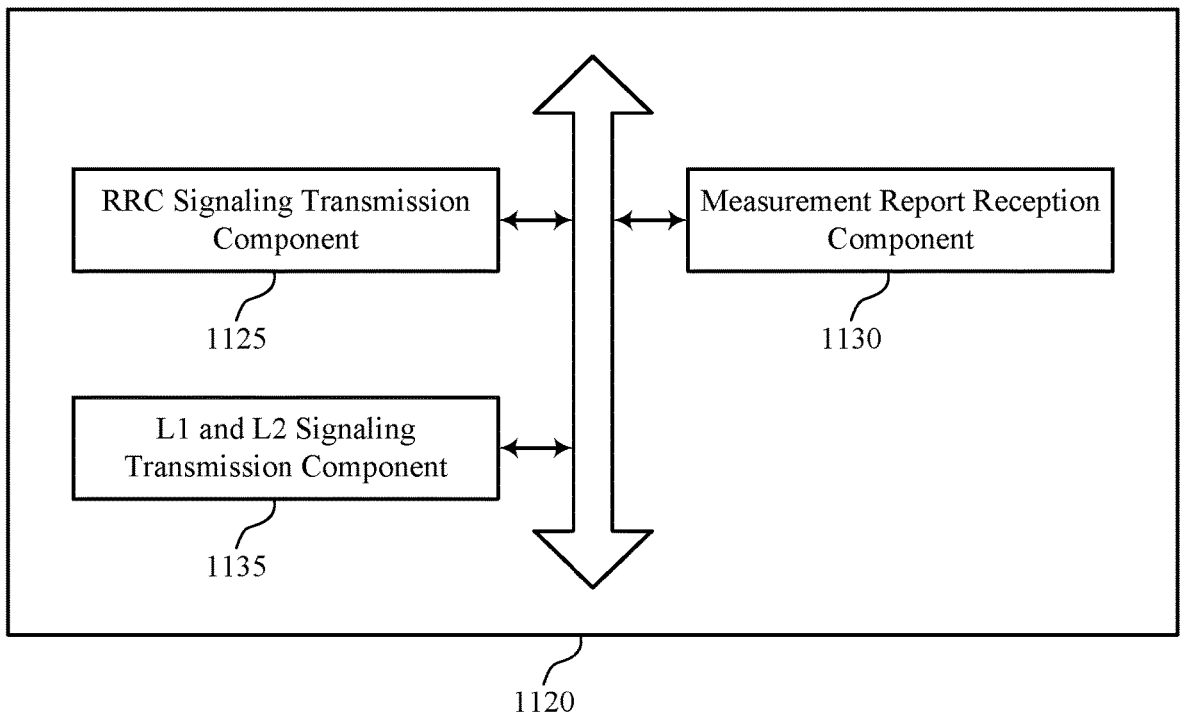
FIG. 11 shows a block diagram of a communications manager that supports group based cell configuration for inter-cell mobility in accordance with one or more aspects of the present disclosure.

FIG. 11 shows a block diagram 1100 of a communications manager 1120 that supports group based cell configuration for inter-cell mobility in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of group based cell configuration for inter-cell mobility as described herein. For example, the communications manager 1120 may include an RRC signaling transmission component 1125, a measurement report reception component 1130, a L1 and L2 signaling transmission component 1135, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1120 may support wireless communications at a network entity in accordance with examples as disclosed herein. The RRC signaling transmission component 1125 may be configured as or otherwise support a means for transmitting, to a UE, first control signaling identifying, of a set of multiple cell groups configured at the UE, an inter-cell mobility configuration for a set of cell groups, where each cell group of the set of multiple cell groups includes a PCell and zero or more SCells. The measurement report reception component 1130 may be configured as or otherwise support a means for receiving, from the UE, a measurement report for each cell group of the set of cell groups for inter-cell mobility. The L1 and L2 signaling transmission component 1135 may be configured as or otherwise support a means for transmitting, at least in part in response to receiving the measurement report, second control signaling activating or deactivating a PCell group for inter-cell mobility from one or more cell groups of the set of cell groups.

In some examples, to support transmitting the first control signaling identifying the inter-cell mobility configuration, the RRC signaling transmission component 1125 may be configured as or otherwise support a means for transmitting, for each cell group of the set of multiple cell groups, a respective set of communication parameters for the cell group.

In some examples, to support transmitting the respective sets of communication parameters, the RRC signaling transmission component 1125 may be configured as or otherwise support a means for transmitting a first set of communication parameters for a first cell group of the set of multiple cell groups. In some examples, to support transmitting the respective sets of communication parameters, the RRC signaling transmission component 1125 may be configured as or otherwise support a means for transmitting a second set of communication parameters for a second cell group of the set of multiple cell groups, the second set of communication parameters including one or more offsets relative to the first set of communication parameters.

In some examples, the respective sets of communication parameters include a bandwidth part indication, a cell index associated with a respective cell group, one or more SSB measurements, timing information, or a combination thereof.

In some examples, to support transmitting the first control signaling identifying the inter-cell mobility configuration, the RRC signaling transmission component 1125 may be configured as or otherwise support a means for transmitting a first indication configuring one or more SCells of the set of multiple cell groups with a PCell capability.

In some examples, to support transmitting the second control signaling, the L1 and L2 signaling transmission component 1135 may be configured as or otherwise support a means for transmitting a second indication for at least one activated cell group, the second indication updating the PCell to be an SCell and an SCell of the zero or more SCells to be a PCell, the second indication in accordance with the PCell capability.

In some examples, the first control signaling includes, for each cell group of the set of multiple cell groups, an indication of whether the cell group is enabled or disabled for inter-cell mobility. In some examples, the second control signaling changes the indication associated with one or more cell groups of the set of multiple cell groups to activate or deactivate the one or more cell groups.

In some examples, the RRC signaling transmission component 1125 may be configured as or otherwise support a means for transmitting a set of indicators corresponding to the set of multiple cell groups, each indicator of the set of indicators identifying whether to release a respective cell group of the set of multiple cell groups, including the one or more cell groups.

In some examples, the RRC signaling transmission component 1125 may be configured as or otherwise support a means for transmitting a set of indicators corresponding to the set of cell groups for use at the UE for inter-cell mobility, each indicator of the set of indicators identifying whether to release a respective cell group of at least one cell group for use at the UE for inter-cell mobility.

In some examples, the RRC signaling transmission component 1125 may be configured as or otherwise support a means for transmitting third control signaling identifying a list of indices corresponding to the set of cell groups for use at the UE for inter-cell mobility, each index of the list of indices corresponding to a respective cell group of the set of cell groups, where the set of indicators are compared to the list of indices to activate or deactivate the one or more cell groups for inter-cell mobility.

In some examples, the first control signaling includes radio resource control signaling, and the second control signaling includes a DCI message or a MAC-CE.

In some examples, the RRC signaling transmission component 1125 may be configured as or otherwise support a means for transmitting, to the UE, a measurement report configuration indicating one or more measurements to include in the measurement report for the set of cell groups, where the measurement report is transmitted in accordance with the measurement report configuration.

Figure 12:
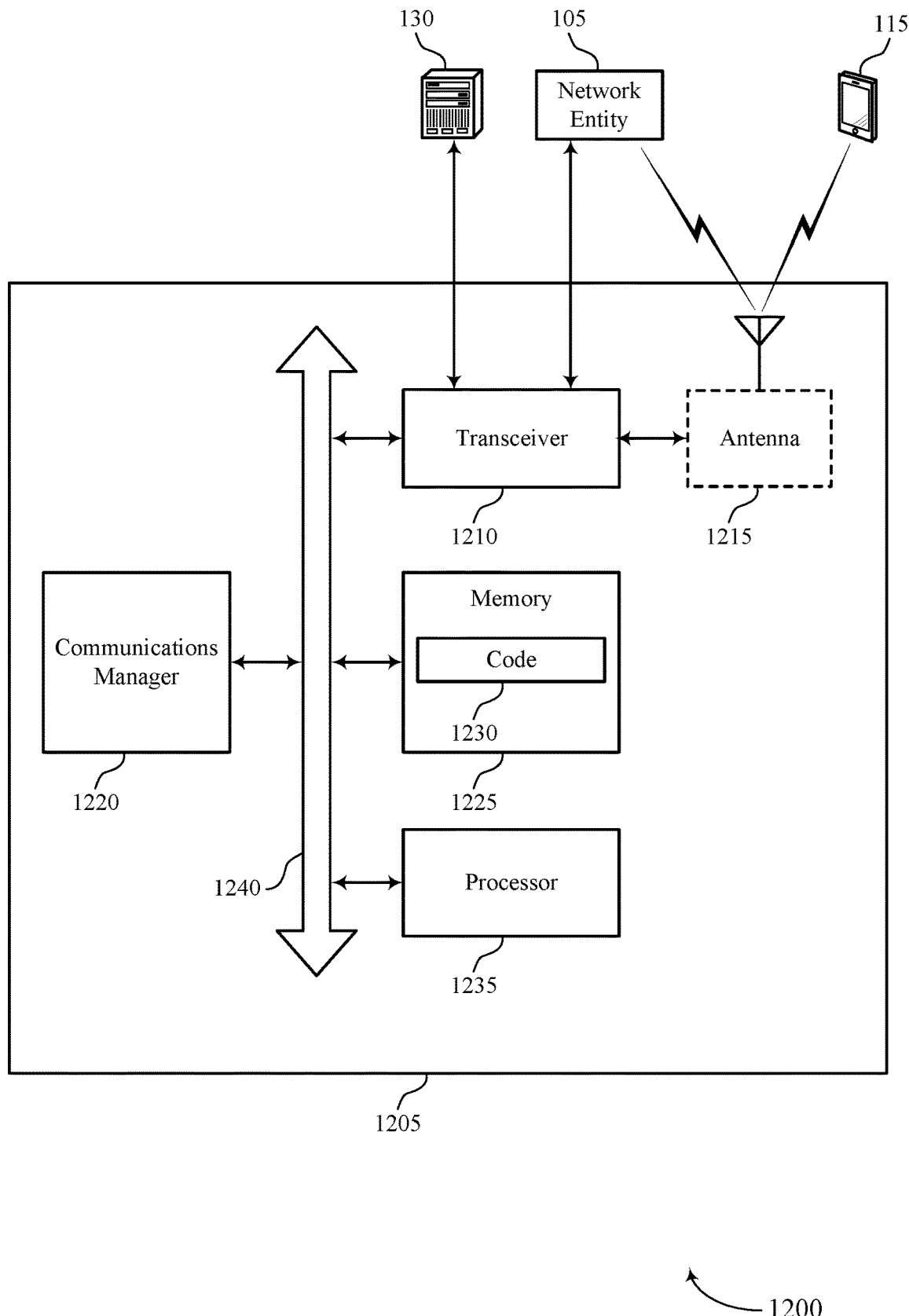
FIG. 12 shows a diagram of a system including a device that supports group based cell configuration for inter-cell mobility in accordance with one or more aspects of the present disclosure.

FIG. 12 shows a diagram of a system 1200 including a device 1205 that supports group based cell configuration for inter-cell mobility in accordance with one or more aspects of the present disclosure. The device 1205 may be an example of or include the components of a device 905, a device 1005, or a network entity 105 as described herein. The device 1205 may communicate with one or more network entities 105, one or more UEs 115, or any combination thereof, which may include communications over one or more wired interfaces, over one or more wireless interfaces, or any combination thereof. The device 1205 may include components that support outputting and obtaining communications, such as a communications manager 1220, a transceiver 1210, an antenna 1215, a memory 1225, code 1230, and a processor 1235. These components may be in electronic communication or otherwise coupled (e.g., operatively, communicatively, functionally, electronically, electrically) via one or more buses (e.g., a bus 1240).

The transceiver 1210 may support bi-directional communications via wired links, wireless links, or both as described herein. In some examples, the transceiver 1210 may include a wired transceiver and may communicate bi-directionally with another wired transceiver. Additionally, or alternatively, in some examples, the transceiver 1210 may include a wireless transceiver and may communicate bi-directionally with another wireless transceiver. In some examples, the device 1205 may include one or more antennas 1215, which may be capable of transmitting or receiving wireless transmissions (e.g., concurrently). The transceiver 1210 may also include a modem to modulate signals, to provide the modulated signals for transmission (e.g., by one or more antennas 1215, by a wired transmitter), to receive modulated signals (e.g., from one or more antennas 1215, from a wired receiver), and to demodulate signals. The transceiver 1210, or the transceiver 1210 and one or more antennas 1215 or wired interfaces, where applicable, may be an example of a transmitter 915, a transmitter 1015, a receiver 910, a receiver 1010, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1225 may include RAM and ROM. The memory 1225 may store computer-readable, computer-executable code 1230 including instructions that, when executed by the processor 1235, cause the device 1205 to perform various functions described herein. The code 1230 may be stored in a non-transitory computer-readable medium such as system memory or another type of memory. In some cases, the code 1230 may not be directly executable by the processor 1235 but may cause a computer (e.g., when compiled and executed) to perform functions described herein. In some cases, the memory 1225 may contain, among other things, a BIOS which may control basic hardware or software operation such as the interaction with peripheral components or devices.

The processor 1235 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1235 may be configured to operate a memory array using a memory controller. In some other cases, a memory controller may be integrated into the processor 1235. The processor 1235 may be configured to execute computer-readable instructions stored in a memory (e.g., the memory 1225) to cause the device 1205 to perform various functions (e.g., functions or tasks supporting group based cell configuration for inter-cell mobility). For example, the device 1205 or a component of the device 1205 may include a processor 1235 and memory 1225 coupled with the processor 1235, the processor 1235 and memory 1225 configured to perform various functions described herein. The processor 1235 may be an example of a cloud-computing platform (e.g., one or more physical nodes and supporting software such as operating systems, virtual machines, or container instances) that may host the functions (e.g., by executing code 1230) to perform the functions of the device 1205.

In some examples, a bus 1240 may support communications of (e.g., within) a protocol layer of a protocol stack. In some examples, a bus 1240 may support communications associated with a logical channel of a protocol stack (e.g., between protocol layers of a protocol stack), which may include communications performed within a component of the device 1205, or between different components of the device 1205 that may be co-located or located in different locations (e.g., where the device 1205 may refer to a system in which one or more of the communications manager 1220, the transceiver 1210, the memory 1225, the code 1230, and the processor 1235 may be located in one of the different components or divided between different components).

In some examples, the communications manager 1220 may manage aspects of communications with a core network 130 (e.g., via one or more wired or wireless backhaul links). For example, the communications manager 1220 may manage the transfer of data communications for client devices, such as one or more UEs 115. In some examples, the communications manager 1220 may manage communications with other network entities 105, and may include a controller or scheduler for controlling communications with UEs 115 in cooperation with other network entities 105. In some examples, the communications manager 1220 may support an X2 interface within an LTE/LTE-A wireless communications network technology to provide communication between network entities 105.

The communications manager 1220 may support wireless communications at a network entity in accordance with examples as disclosed herein. For example, the communications manager 1220 may be configured as or otherwise support a means for transmitting, to a UE, first control signaling identifying, of a set of multiple cell groups configured at the UE, an inter-cell mobility configuration for a set of cell groups, where each cell group of the set of multiple cell groups includes a PCell and zero or more SCells. The communications manager 1220 may be configured as or otherwise support a means for receiving, from the UE, a measurement report for each cell group of the set of cell groups for inter-cell mobility. The communications manager 1220 may be configured as or otherwise support a means for transmitting, at least in part in response to receiving the measurement report, second control signaling activating or deactivating a PCell group for inter-cell mobility from one or more cell groups of the set of cell groups.

By including or configuring the communications manager 1220 in accordance with examples as described herein, the device 1205 may support techniques for enhanced inter cell mobility communications with may result in improved communication reliability, reduced latency, improved user experience related to reduced processing, reduced power consumption, more efficient utilization of communication resources, improved coordination between devices, longer battery life, and improved utilization of processing capability.

In some examples, the communications manager 1220 may be configured to perform various operations (e.g., receiving, obtaining, monitoring, outputting, transmitting) using or otherwise in cooperation with the transceiver 1210, the one or more antennas 1215 (e.g., where applicable), or any combination thereof. Although the communications manager 1220 is illustrated as a separate component, in some examples, one or more functions described with reference to the communications manager 1220 may be supported by or performed by the processor 1235, the memory 1225, the code 1230, the transceiver 1210, or any combination thereof. For example, the code 1230 may include instructions executable by the processor 1235 to cause the device 1205 to perform various aspects of group based cell configuration for inter-cell mobility as described herein, or the processor 1235 and the memory 1225 may be otherwise configured to perform or support such operations.

Figure 13:
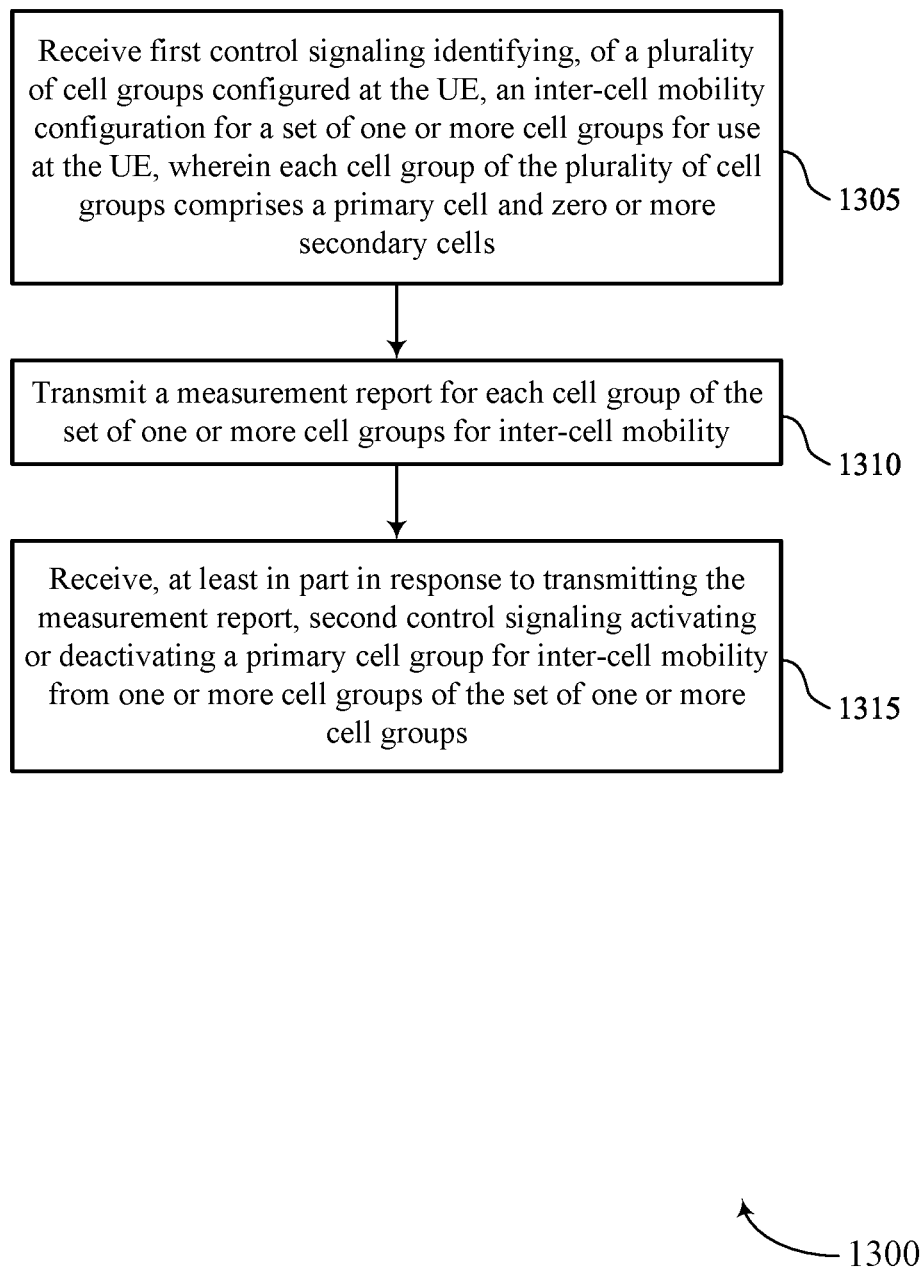
FIGS. 13 through 16 show flowcharts illustrating methods that support group based cell configuration for inter-cell mobility in accordance with one or more aspects of the present disclosure.

FIG. 13 shows a flowchart illustrating a method 1300 that supports group based cell configuration for inter-cell mobility in accordance with one or more aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include receiving first control signaling identifying, of a plurality of cell groups configured at the UE, an inter-cell mobility configuration for a set of one or more cell groups for use at the UE, wherein each cell group of the plurality of cell groups comprises a primary cell and zero or more secondary cells. The operations of 1305 may be performed in accordance with examples as disclosed herein. In some examples, aspects of the operations of 1305 may be performed by an RRC signaling reception component 725 as described with reference to FIG. 7.

At 1310, the method may include transmitting a measurement report for each cell group of the set of one or more cell groups for inter-cell mobility. The operations of 1310 may be performed in accordance with examples as disclosed herein. In some examples, aspects of the operations of 1310 may be performed by a measurement report transmission component 730 as described with reference to FIG. 7.

At 1315, the method may include receiving, at least in part in response to transmitting the measurement report, second control signaling activating or deactivating a primary cell group for inter-cell mobility from one or more cell groups of the set of one or more cell groups. The operations of 1315 may be performed in accordance with examples as disclosed herein. In some examples, aspects of the operations of 1315 may be performed by a L1 and L2 signaling reception component 735 as described with reference to FIG. 7.

Figure 14:
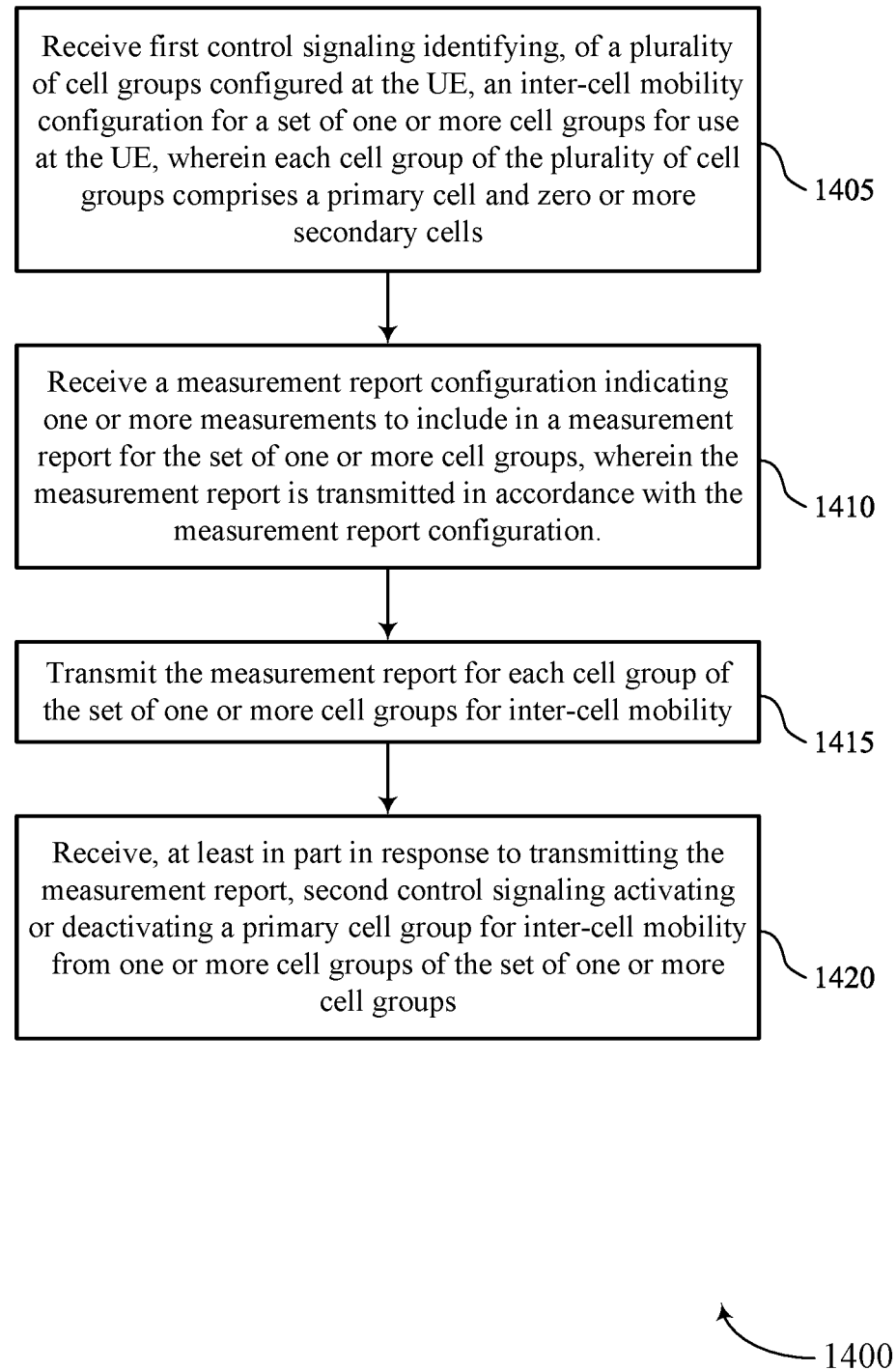

FIG. 14 shows a flowchart illustrating a method 1400 that supports group based cell configuration for inter-cell mobility in accordance with one or more aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include receiving first control signaling identifying, of a plurality of cell groups configured at the UE, an inter-cell mobility configuration for a set of one or more cell groups for use at the UE, wherein each cell group of the plurality of cell groups comprises a primary cell and zero or more secondary cells. The operations of 1405 may be performed in accordance with examples as disclosed herein. In some examples, aspects of the operations of 1405 may be performed by an RRC signaling reception component 725 as described with reference to FIG. 7.

At 1410, the method may include receiving receive a measurement report configuration indicating one or more measurements to include in a measurement report for the set of one or more cell groups, wherein the measurement report is transmitted in accordance with the measurement report configuration. The operations of 1410 may be performed in accordance with examples as disclosed herein. In some examples, aspects of the operations of 1410 may be performed by an RRC signaling reception component 725 as described with reference to FIG. 7.

At 1415, the method may include transmitting the measurement report for each cell group of the set of one or more cell groups for inter-cell mobility. The operations of 1415 may be performed in accordance with examples as disclosed herein. In some examples, aspects of the operations of 1415 may be performed by a measurement report transmission component 730 as described with reference to FIG. 7.

At 1420, the method may include receiving, at least in part in response to transmitting the measurement report, second control signaling activating or deactivating a primary cell group for inter-cell mobility from one or more cell groups of the set of one or more cell groups. The operations of 1420 may be performed in accordance with examples as disclosed herein. In some examples, aspects of the operations of 1420 may be performed by a L1 and L2 signaling reception component 735 as described with reference to FIG. 7.

Figure 15:
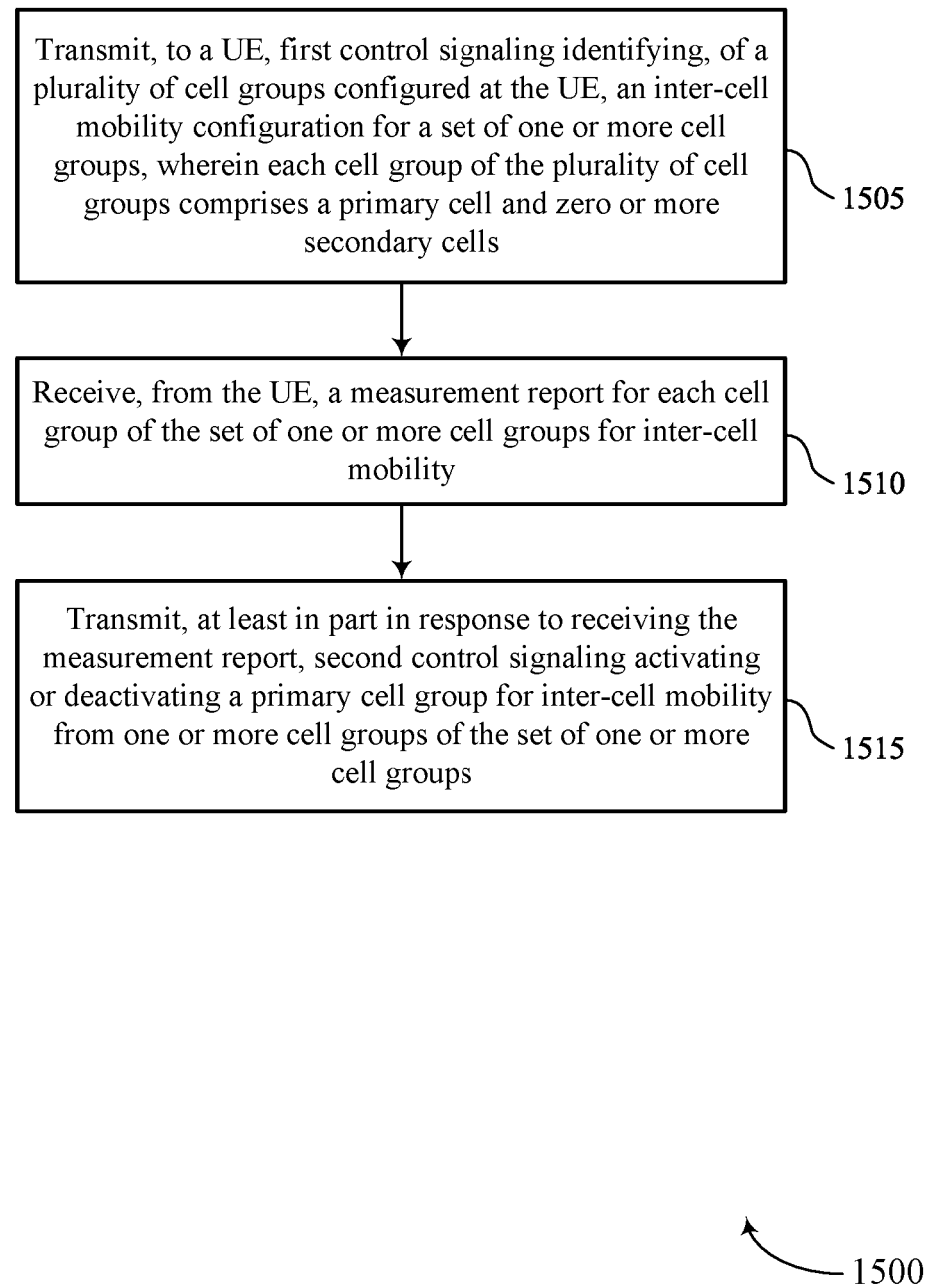

FIG. 15 shows a flowchart illustrating a method 1500 that supports group based cell configuration for inter-cell mobility in accordance with one or more aspects of the present disclosure. The operations of the method 1500 may be implemented by a network entity or its components as described herein. For example, the operations of the method 1500 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1505, the method may include transmitting, to a UE, first control signaling identifying, of a plurality of cell groups configured at the UE, an inter-cell mobility configuration for a set of one or more cell groups, wherein each cell group of the plurality of cell groups comprises a primary cell and zero or more secondary cells. The operations of 1505 may be performed in accordance with examples as disclosed herein. In some examples, aspects of the operations of 1505 may be performed by an RRC signaling transmission component 1125 as described with reference to FIG. 11.

At 1510, the method may include receiving, from the UE, a measurement report for each cell group of the set of one or more cell groups for inter-cell mobility. The operations of 1510 may be performed in accordance with examples as disclosed herein. In some examples, aspects of the operations of 1510 may be performed by a measurement report reception component 1130 as described with reference to FIG. 11.

At 1515, the method may include transmitting, at least in part in response to receiving the measurement report, second control signaling activating or deactivating a primary cell group for inter-cell mobility from one or more cell groups of the set of one or more cell groups. The operations of 1515 may be performed in accordance with examples as disclosed herein. In some examples, aspects of the operations of 1515 may be performed by a L1 and L2 signaling transmission component 1135 as described with reference to FIG. 11.

Figure 16:
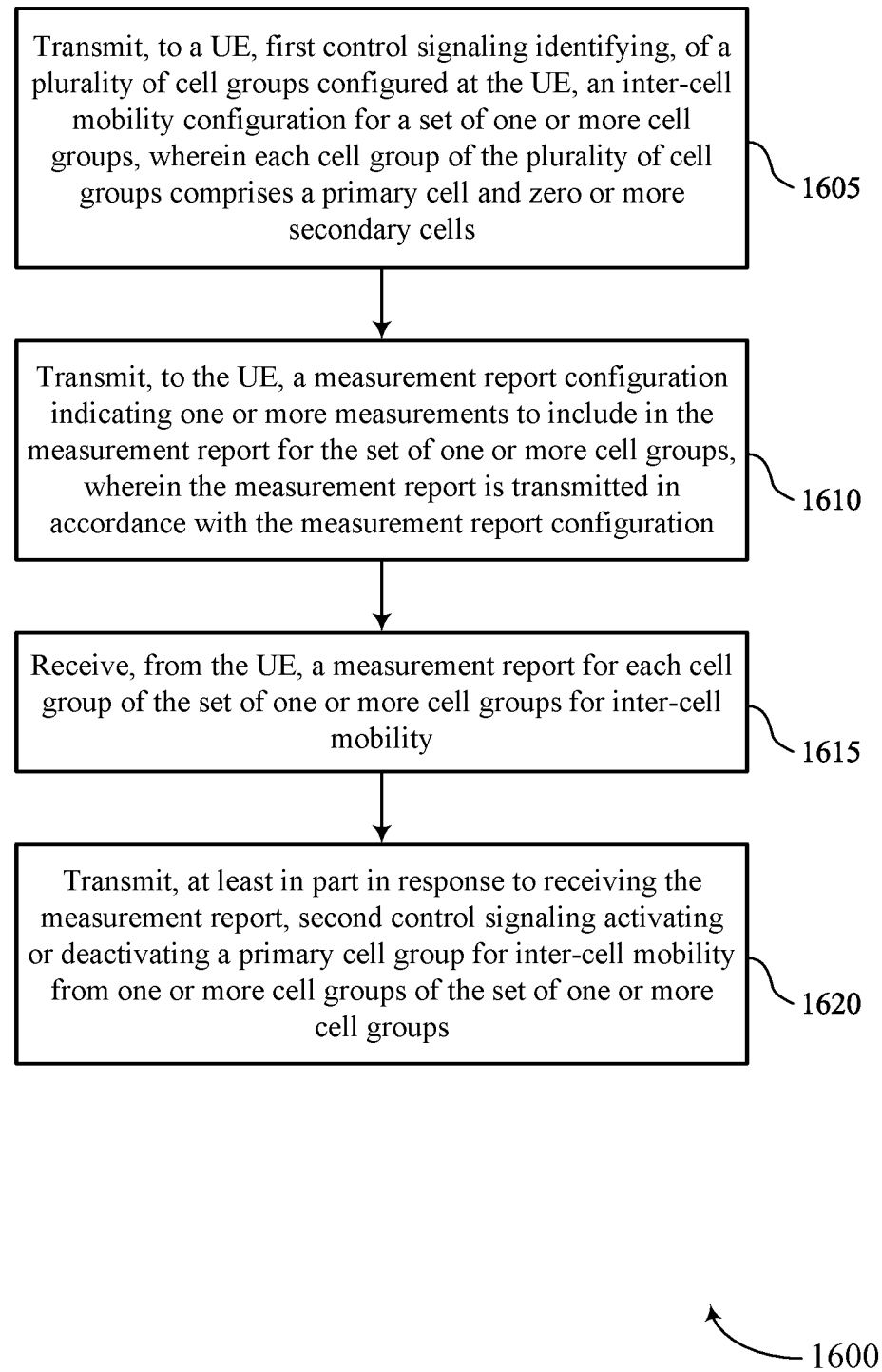

FIG. 16 shows a flowchart illustrating a method 1600 that supports group based cell configuration for inter-cell mobility in accordance with one or more aspects of the present disclosure. The operations of the method 1600 may be implemented by a network entity or its components as described herein. For example, the operations of the method 1600 may be performed by a network entity as described with reference to FIGS. 1 through 4 and 9 through 12. In some examples, a network entity may execute a set of instructions to control the functional elements of the network entity to perform the described functions. Additionally, or alternatively, the network entity may perform aspects of the described functions using special-purpose hardware.

At 1605, the method may include transmitting, to a UE, first control signaling identifying, of a plurality of cell groups configured at the UE, an inter-cell mobility configuration for a set of one or more cell groups, wherein each cell group of the plurality of cell groups comprises a primary cell and zero or more secondary cells. The operations of 1605 may be performed in accordance with examples as disclosed herein. In some examples, aspects of the operations of 1605 may be performed by an RRC signaling transmission component 1125 as described with reference to FIG. 11.

At 1610, the method may include transmitting, to the UE, a measurement report configuration indicating one or more measurements to include in the measurement report for the set of one or more cell groups, wherein the measurement report is transmitted in accordance with the measurement report configuration. The operations of 1610 may be performed in accordance with examples as disclosed herein. In some examples, aspects of the operations of 1610 may be performed by an RRC signaling transmission component 1125 as described with reference to FIG. 11.

At 1615, the method may include receiving, from the UE, a measurement report for each cell group of the set of one or more cell groups for inter-cell mobility. The operations of 1615 may be performed in accordance with examples as disclosed herein. In some examples, aspects of the operations of 1615 may be performed by a measurement report reception component 1130 as described with reference to FIG. 11.

At 1620, the method may include transmitting, at least in part in response to receiving the measurement report, second control signaling activating or deactivating a primary cell group for inter-cell mobility from one or more cell groups of the set of one or more cell groups. The operations of 1620 may be performed in accordance with examples as disclosed herein. In some examples, aspects of the operations of 1620 may be performed by a L1 and L2 signaling transmission component 1135 as described with reference to FIG. 11.

The following provides an overview of aspects of the present disclosure:

Aspect 1: A method for wireless communications at a UE, comprising: receiving first control signaling identifying, of a plurality of cell groups configured at the UE, an inter-cell mobility configuration for a set of cell groups for use at the UE, wherein each cell group of the plurality of cell groups comprises a PCell and zero or more SCells; transmitting a measurement report for each cell group of the set of cell groups for inter-cell mobility; and receiving, at least in part in response to transmitting the measurement report, second control signaling activating or deactivating a PCell group for inter-cell mobility from one or more cell groups of the set of cell groups.

Aspect 2: The method of aspect 1, wherein receiving the first control signaling identifying the inter-cell mobility configuration comprises: receiving, for each cell group of the plurality of cell groups, a respective set of communication parameters for the cell group.

Aspect 3: The method of aspect 2, wherein receiving the respective sets of communication parameters further comprises: receiving a first set of communication parameters for a first cell group of the plurality of cell groups; and receiving a second set of communication parameters for a second cell group of the plurality of cell groups, the second set of communication parameters comprising one or more offsets relative to the first set of communication parameters.

Aspect 4: The method of any of aspects 2 through 3, wherein the respective sets of communication parameters comprise a bandwidth part indication, a cell index associated with a respective cell group, one or more SSB measurements, timing information, or a combination thereof.

Aspect 5: The method of any of aspects 1 through 4, wherein receiving the first control signaling identifying the inter-cell mobility configuration further comprises: receiving a first indication configuring one or more SCells of the plurality of cell groups with a PCell capability.

Aspect 6: The method of aspect 5, wherein receiving the second control signaling further comprises: receiving a second indication for at least one activated cell group, the second indication updating the PCell to be a SCell and a SCell of the zero or more SCells to be a PCell, the second indication in accordance with the PCell capability.

Aspect 7: The method of any of aspects 1 through 6, wherein the first control signaling comprises, for each cell group of the plurality of cell groups, an indication of whether the cell group is enabled or disabled for inter-cell mobility, and the second control signaling changes the indication associated with one or more cell groups of the plurality of cell groups to activate or deactivate the one or more cell groups.

Aspect 8: The method of any of aspects 1 through 7, further comprising: receiving a set of indicators corresponding to the plurality of cell groups, each indicator of the set of indicators identifying whether to release a respective cell group of the plurality of cell groups, including the one or more cell groups.

Aspect 9: The method of any of aspects 1 through 8, further comprising: receiving a set of indicators corresponding to the set of cell groups for use at the UE for inter-cell mobility, each indicator of the set of indicators identifying whether to release a respective cell group of at least on cell group for use at the UE for inter-cell mobility.

Aspect 10: The method of aspect 9, further comprising: receiving third control signaling identifying a list of indices corresponding to the set of cell groups for use at the UE for inter-cell mobility, each index of the list of indices corresponding to a respective cell group of the set of cell groups, wherein the set of indicators are compared to the list of indices to activate or deactivate the one or more cell groups for inter-cell mobility.

Aspect 11: The method of any of aspects 1 through 10, wherein the first control signaling comprises RRC signaling, and the second control signaling comprises a DCI message or a MAC-CE.

Aspect 12: The method of any of aspects 1 through 11, further comprising: receiving a measurement report configuration indicating one or more measurements to include in the measurement report for the set of cell groups, wherein the measurement report is transmitted in accordance with the measurement report configuration.

Aspect 13: A method for wireless communications at a network entity, comprising: transmitting, to a UE, first control signaling identifying, of a plurality of cell groups configured at the UE, an inter-cell mobility configuration for a set of cell groups, wherein each cell group of the plurality of cell groups comprises a PCell and zero or more SCells; receiving, from the UE, a measurement report for each cell group of the set of cell groups for inter-cell mobility; and transmitting, at least in part in response to receiving the measurement report, second control signaling activating or deactivating a PCell group for inter-cell mobility from one or more cell groups of the set of cell groups.

Aspect 14: The method of aspect 13, wherein transmitting the first control signaling identifying the inter-cell mobility configuration comprises: transmitting, for each cell group of the plurality of cell groups, a respective set of communication parameters for the cell group.

Aspect 15: The method of aspect 14, wherein transmitting the respective sets of communication parameters further comprises: transmitting a first set of communication parameters for a first cell group of the plurality of cell groups; and transmitting a second set of communication parameters for a second cell group of the plurality of cell groups, the second set of communication parameters comprising one or more offsets relative to the first set of communication parameters.

Aspect 16: The method of any of aspects 14 through 15, wherein the respective sets of communication parameters comprise a bandwidth part indication, a cell index associated with a respective cell group, one or more SSB measurements, timing information, or a combination thereof.

Aspect 17: The method of any of aspects 13 through 16, wherein transmitting the first control signaling identifying the inter-cell mobility configuration further comprises: transmitting a first indication configuring one or more SCells of the plurality of cell groups with a PCell capability.

Aspect 18: The method of aspect 17, wherein transmitting the second control signaling further comprises: transmitting a second indication for at least one activated cell group, the second indication updating the PCell to be a SCell and a SCell of the zero or more SCells to be a PCell, the second indication in accordance with the PCell capability.

Aspect 19: The method of any of aspects 13 through 18, wherein the first control signaling comprises, for each cell group of the plurality of cell groups, an indication of whether the cell group is enabled or disabled for inter-cell mobility, and the second control signaling changes the indication associated with one or more cell groups of the plurality of cell groups to activate or deactivate the one or more cell groups.

Aspect 20: The method of any of aspects 13 through 19, further comprising: transmitting a set of indicators corresponding to the plurality of cell groups, each indicator of the set of indicators identifying whether to release a respective cell group of the plurality of cell groups, including the one or more cell groups.

Aspect 21: The method of any of aspects 13 through 20, further comprising: transmitting a set of indicators corresponding to the set of cell groups for use at the UE for inter-cell mobility, each indicator of the set of indicators identifying whether to release a respective cell group of at least one cell group for use at the UE for inter-cell mobility.

Aspect 22: The method of aspect 21, further comprising: transmitting third control signaling identifying a list of indices corresponding to the set of cell groups for use at the UE for inter-cell mobility, each index of the list of indices corresponding to a respective cell group of the set of cell groups, wherein the set of indicators are compared to the list of indices to activate or deactivate the one or more cell groups for inter-cell mobility.

Aspect 23: The method of any of aspects 13 through 22, wherein the first control signaling comprises RRC signaling, and the second control signaling comprises a DCI message or a MAC-CE.

Aspect 24: The method of any of aspects 13 through 23, further comprising: transmitting, to the UE, a measurement report configuration indicating one or more measurements to include in the measurement report for the set of cell groups, wherein the measurement report is transmitted in accordance with the measurement report configuration.

Aspect 25: An apparatus for wireless communications at a UE, comprising a processor; memory coupled with the processor; and instructions stored in the memory and executable by the processor to cause the apparatus to perform a method of any of aspects 1 through 12.

Aspect 26: An apparatus for wireless communications at a UE, comprising at least one means for performing a method of any of aspects 1 through 12.

Aspect 27: A non-transitory computer-readable medium storing code for wireless communications at a UE, the code comprising instructions executable by a processor to perform a method of any of aspects 1 through 12.

Aspect 28: An apparatus for wireless communications at a network entity, comprising a processor; memory coupled with the processor; and instructions stored in the memory and executable by the processor to cause the apparatus to perform a method of any of aspects 13 through 24.

Aspect 29: An apparatus for wireless communications at a network entity, comprising at least one means for performing a method of any of aspects 13 through 24.

Aspect 30: A non-transitory computer-readable medium storing code for wireless communications at a network entity, the code comprising instructions executable by a processor to perform a method of any of aspects 13 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database, or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
  one or more processors;

one or more memories coupled with the one or more processors; and instructions stored in the one or more memories and executable by the one or more processors to cause the apparatus to:

receive first control signaling identifying, of a plurality of cell groups configured at the UE, an inter-cell mobility configuration for a set of one or more cell groups for use at the UE, wherein each cell group of the plurality of cell groups comprises a primary cell and zero or more secondary cells;

transmit a cell group measurement report including measurements for each cell group of the set of one or more cell groups for inter-cell mobility; and receive, at least in part in response to transmitting the cell group measurement report, second control signaling activating or deactivating a primary cell group for inter-cell mobility from one or more cell groups of the set of one or more cell groups.

2. The apparatus of claim 1, wherein the instructions to receive the first control signaling identifying the inter-cell mobility configuration are executable by the one or more processors to cause the apparatus to:

receive, for each cell group of the plurality of cell groups, a respective set of one or more communication parameters for the cell group.

3. The apparatus of claim 2, wherein the instructions to receive the respective sets of the one or more communication parameters are further executable by the one or more processors to cause the apparatus to:

receive a first set of one or more communication parameters for a first cell group of the plurality of cell groups; and receive a second set of one or more communication parameters for a second cell group of the plurality of cell groups, the second set of one or more communication parameters comprising one or more offsets relative to the first set of one or more communication parameters.

4. The apparatus of claim 2, wherein the respective sets of one or more communication parameters comprise a bandwidth part indication, a cell index associated with a respective cell group, one or more synchronization signal block measurements, timing information, or a combination thereof.

5. The apparatus of claim 1, wherein the instructions to receive the first control signaling identifying the inter-cell mobility configuration are further executable by the one or more processors to cause the apparatus to:

receive a first indication configuring one or more secondary cells of the plurality of cell groups with a primary cell capability.

6. The apparatus of claim 5, wherein the instructions to receive the second control signaling are further executable by the one or more processors to cause the apparatus to:

receive a second indication for at least one activated cell group, the second indication updating the primary cell to be a secondary cell and a secondary cell of the zero or more secondary cells to be a primary cell, the second indication in accordance with the primary cell capability.

7. The apparatus of claim 1, wherein:

the first control signaling comprises, for each cell group of the plurality of cell groups, an indication of whether the cell group is enabled or disabled for inter-cell mobility, and the second control signaling changes the indication associated with one or more cell groups of the plurality of cell groups to activate or deactivate the one or more cell groups.

8. The apparatus of claim 1, wherein the instructions are further executable by the one or more processors to cause the apparatus to:

receive a set of one or more indicators corresponding to the plurality of cell groups, each indicator of the set of one or more indicators identifying whether to release a respective cell group of the plurality of cell groups, including the one or more cell groups.

9. The apparatus of claim 1, wherein the instructions are further executable by the one or more processors to cause the apparatus to:

receive a set of one or more indicators corresponding to the set of one or more cell groups for use at the UE for inter-cell mobility, each indicator of the set of one or more indicators identifying whether to release a respective cell group of at least on cell group for use at the UE for inter-cell mobility.

10. The apparatus of claim 9, wherein the instructions are further executable by the one or more processors to cause the apparatus to:

receive third control signaling identifying a list of indices corresponding to the set of one or more cell groups for use at the UE for inter-cell mobility, each index of the list of indices corresponding to a respective cell group of the set of one or more cell groups, wherein the set of one or more indicators are compared to the list of indices to activate or deactivate the one or more cell groups for inter-cell mobility.

11. The apparatus of claim 1, wherein the first control signaling comprises radio resource control signaling, and the second control signaling comprises a downlink control information message or a media access control control element.

12. The apparatus of claim 1, wherein the instructions are further executable by the one or more processors to cause the apparatus to:

receive a cell group measurement report configuration indicating one or more measurements to include in the cell group measurement report for the set of one or more cell groups, wherein the cell group measurement report is transmitted in accordance with the cell group measurement report configuration.

13. An apparatus for wireless communications at a network entity, comprising:

one or more processors;

one or more memories coupled with the one or more processors; and instructions stored in the one or more memories and executable by the one or more processors to cause the apparatus to:

transmit, to a user equipment (UE), first control signaling identifying, of a plurality of cell groups configured at the UE, an inter-cell mobility configuration for a set of one or more cell groups, wherein each cell group of the plurality of cell groups comprises a primary cell and zero or more secondary cells;

receive, from the UE, a cell group measurement report including measurements for each cell group of the set of one or more cell groups for inter-cell mobility; and transmit, at least in part in response to receiving the cell group measurement report, second control signaling activating or deactivating a primary cell group for inter-cell mobility from one or more cell groups of the set of one or more cell groups.

14. The apparatus of claim 13, wherein the instructions to transmit the first control signaling identifying the inter-cell mobility configuration are executable by the one or more processors to cause the apparatus to:
   transmit, for each cell group of the plurality of cell groups, a respective set of one or more communication parameters for the cell group.

15. The apparatus of claim 14, wherein the instructions to transmit the respective sets of communication parameters are further executable by the one or more processors to cause the apparatus to:
   transmit a first set of one or more communication parameters for a first cell group of the plurality of cell groups; and
   transmit a second set of one or more communication parameters for a second cell group of the plurality of cell groups, the second set of one or more communication parameters comprising one or more offsets relative to the first set of one or more communication parameters.

16. The apparatus of claim 14, wherein the respective sets of communication parameters comprise a bandwidth part indication, a cell index associated with a respective cell group, one or more synchronization signal block measurements, timing information, or a combination thereof.

17. The apparatus of claim 13, wherein the instructions to transmit the first control signaling identifying the inter-cell mobility configuration are further executable by the one or more processors to cause the apparatus to:
   transmit a first indication configuring one or more secondary cells of the plurality of cell groups with a primary cell capability.

18. The apparatus of claim 17, wherein the instructions to transmit the second control signaling are further executable by the one or more processors to cause the apparatus to:
   transmit a second indication for at least one activated cell group, the second indication updating the primary cell to be a secondary cell and a secondary cell of the zero or more secondary cells to be a primary cell, the second indication in accordance with the primary cell capability.

19. The apparatus of claim 13, wherein:
   the first control signaling comprises, for each cell group of the plurality of cell groups, an indication of whether the cell group is enabled or disabled for inter-cell mobility, and
   the second control signaling changes the indication associated with one or more cell groups of the plurality of cell groups to activate or deactivate the one or more cell groups.

20. The apparatus of claim 13, wherein the instructions are further executable by the one or more processors to cause the apparatus to:
   transmit a set of one or more indicators corresponding to the plurality of cell groups, each indicator of the set of one or more indicators identifying whether to release a respective cell group of the plurality of cell groups, including the one or more cell groups.

21. The apparatus of claim 13, wherein the instructions are further executable by the one or more processors to cause the apparatus to:
   transmit a set of one or more indicators corresponding to the set of one or more cell groups for use at the UE for inter-cell mobility, each indicator of the set of one or more indicators identifying whether to release a respective cell group of at least one cell group for use at the UE for inter-cell mobility.

22. The apparatus of claim 21, wherein the instructions are further executable by the one or more processors to cause the apparatus to:
   transmit third control signaling identifying a list of indices corresponding to the set of one or more cell groups for use at the UE for inter-cell mobility, each index of the list of indices corresponding to a respective cell group of the set of one or more cell groups, wherein the set of one or more indicators are compared to the list of indices to activate or deactivate the one or more cell groups for inter-cell mobility.

23. The apparatus of claim 13, wherein the first control signaling comprises radio resource control signaling, and the second control signaling comprises a downlink control information message or a media access control control element.

24. The apparatus of claim 13, wherein the instructions are further executable by the one or more processors to cause the apparatus to:
   transmit, to the UE, a cell group measurement report configuration indicating one or more measurements to include in the cell group measurement report for the set of one or more cell groups, wherein the cell group measurement report is transmitted in accordance with the cell group measurement report configuration.

25. A method for wireless communications at a user equipment (UE), comprising:
   receiving first control signaling identifying, of a plurality of cell groups configured at the UE, an inter-cell mobility configuration for a set of one or more cell groups for use at the UE, wherein each cell group of the plurality of cell groups comprises a primary cell and zero or more secondary cells;
   transmitting a cell group measurement report including measurements for each cell group of the set of one or more cell groups for inter-cell mobility; and
   receiving, at least in part in response to transmitting the cell group measurement report, second control signaling activating or deactivating a primary cell group for inter-cell mobility from one or more cell groups of the set of one or more cell groups.

26. The method of claim 25, wherein receiving the first control signaling identifying the inter-cell mobility configuration comprises:
   receiving, for each cell group of the plurality of cell groups, a respective set of one or more communication parameters for the cell group.

27. The method of claim 26, wherein receiving the respective sets of communication parameters further comprises:
   receiving a first set of one or more communication parameters for a first cell group of the plurality of cell groups; and
   receiving a second set of one or more communication parameters for a second cell group of the plurality of cell groups, the second set of one or more communication parameters comprising one or more offsets relative to the first set of one or more communication parameters.

28. The method of claim 26, wherein the respective sets of communication parameters comprise a bandwidth part indication, a cell index associated with a respective cell group, one or more synchronization signal block measurements, timing information, or a combination thereof.

29. A method for wireless communications at a network entity, comprising:

transmitting, to a user equipment (UE), first control signaling identifying, of a plurality of cell groups configured at the UE, an inter-cell mobility configuration for a set of one or more cell groups, wherein each cell group of the plurality of cell groups comprises a primary cell and zero or more secondary cells;

receiving, from the UE, a cell group measurement report including measurements for each cell group of the set of one or more cell groups for inter-cell mobility; and transmitting, at least in part in response to receiving the cell group measurement report, second control signaling activating or deactivating a primary cell group for inter-cell mobility from one or more cell groups of the set of one or more cell groups.

30. The method of claim 29, wherein transmitting the first control signaling identifying the inter-cell mobility configuration comprises:

transmitting, for each cell group of the plurality of cell groups, a respective set of one or more communication parameters for the cell group.

\* \* \* \* \*